United States Patent
Lei et al.

(10) Patent No.: US 11,683,147 B2
(45) Date of Patent: Jun. 20, 2023

(54) PHYSICAL DOWNLINK CONTROL CHANNEL (PDCCH) ORDERED UPLINK CARRIER SWITCHING FOR HALF-DUPLEX FREQUENCY DIVISION DUPLEX (HD-FDD) USER EQUIPMENT

(71) Applicant: QUALCOMM Incorporated, San Diego, CA (US)

(72) Inventors: Jing Lei, San Diego, CA (US); Wanshi Chen, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 219 days.

(21) Appl. No.: 17/319,001

(22) Filed: May 12, 2021

(65) Prior Publication Data
US 2021/0359832 A1     Nov. 18, 2021

Related U.S. Application Data

(60) Provisional application No. 63/023,720, filed on May 12, 2020.

(51) Int. Cl.
*H04L 5/16* (2006.01)
*H04W 72/1263* (2023.01)
(Continued)

(52) U.S. Cl.
CPC .............. *H04L 5/16* (2013.01); *H04L 1/0061* (2013.01); *H04W 72/0453* (2013.01);
(Continued)

(58) Field of Classification Search
CPC ......... H04L 5/001; H04L 5/0044; H04L 5/16; H04L 1/0061; H04W 72/0453;
(Continued)

(56) References Cited

U.S. PATENT DOCUMENTS 11,375,527 B1 * 6/2022 Eyuboglu .......... H04B 7/15528
2012/0176950 A1 * 7/2012 Zhang ..................... H04L 5/001
                                                                370/311

(Continued)

FOREIGN PATENT DOCUMENTS

EP       2451239 B1 *  4/2015  ............. H04L 5/001
EP       2653001 B1 *  3/2018  ......... H04W 72/1257
(Continued)

*Primary Examiner* — Chi H Pham
*Assistant Examiner* — Vladislav Y Agureyev
(74) *Attorney, Agent, or Firm* — Loza & Loza, LLP

(57) ABSTRACT

A scheduling entity receives, from a half-duplex frequency division duplex (HD-FDD) UE, an initial attach request on a first uplink carrier of a primary cell. It enters into an RRC connected state with the HD-FDD UE and determines an amount of data waiting for uplink in a buffer of the HD-FDD UE. It determines a target uplink carrier and a grant of time for the HD-FDD UE to upload the buffered data. It then transmits downlink control information (DCI) allocating the target uplink carrier for the determined time to the HD-FDD UE. The HD-FDD UE communicates with the scheduling entity via the first uplink carrier, receives the DCI, and switches from the first uplink carrier to the target uplink carrier. It then transmits, over the target uplink carrier, the buffered data to the scheduling entity for the determined time.

20 Claims, 11 Drawing Sheets

(51) Int. Cl.
  *H04L 1/00* (2006.01)
  *H04W 72/044* (2023.01)
  *H04W 72/0453* (2023.01)
  *H04W 72/23* (2023.01)

(52) U.S. Cl.
  CPC ... *H04W 72/0466* (2013.01); *H04W 72/1263* (2013.01); *H04W 72/23* (2023.01)

(58) Field of Classification Search
  CPC ......... H04W 72/0466; H04W 72/1263; H04W 72/23; H04W 52/325; H04W 52/54; H04W 60/04; H04W 76/15
  See application file for complete search history.

(56) References Cited

U.S. PATENT DOCUMENTS

| | | | | |
|---|---|---|---|---|
| 2015/0359028 A1* | 12/2015 | Iyer | ............ | H04W 76/15 370/329 |
| 2016/0080131 A1* | 3/2016 | Terry | ............ | H04L 1/1854 370/330 |
| 2016/0100422 A1* | 4/2016 | Papasakellariou | .... | H04W 72/23 370/329 |
| 2016/0112178 A1* | 4/2016 | Yi | ............ | H04W 72/566 370/280 |
| 2017/0317806 A1* | 11/2017 | Beale | ............ | H04W 48/10 |
| 2018/0007667 A1* | 1/2018 | You | ............ | H04W 72/12 |
| 2019/0149380 A1* | 5/2019 | Babaei | ............ | H04W 72/044 370/330 |
| 2019/0261287 A1* | 8/2019 | Deenoo | ............ | H04W 24/08 |
| 2019/0274077 A1* | 9/2019 | Suzuki | ............ | H04W 36/08 |
| 2019/0320467 A1* | 10/2019 | Freda | ............ | H04W 74/004 |
| 2020/0022043 A1* | 1/2020 | Pelletier | ............ | H04W 36/305 |
| 2020/0028635 A1* | 1/2020 | Lee | ............ | H04L 5/0094 |
| 2021/0037530 A1* | 2/2021 | Shih | ............ | H04B 7/0404 |
| 2021/0243784 A1* | 8/2021 | Goto | ............ | H04L 1/0016 |
| 2022/0015001 A1* | 1/2022 | Parichehrehteroujeni | ............ | H04W 36/00 |
| 2022/0225236 A1* | 7/2022 | Bang | ............ | H04W 72/04 |

FOREIGN PATENT DOCUMENTS

| | | | | |
|---|---|---|---|---|
| WO | WO-2013015652 A2 * | 1/2013 | ............ | H04J 11/003 |
| WO | WO-2017127015 A1 * | 7/2017 | ............ | H04L 5/001 |
| WO | WO-2017171422 A1 * | 10/2017 | ............ | H04L 5/001 |
| WO | WO-2020078551 A1 * | 4/2020 | | |

* cited by examiner

FIG. 11

| Field | No. of Bits | Description |
|---|---|---|
| Identifier for DCI formats | 1 | Differentiates DCI format 0_0 and DCI format 1_0. For DCI format 1_0, this field is set to "1" |
| Frequency Domain Resource Assignment (FDRA) | Determined by the No. of RBs in DL BWP | All bits set to "1" |
| Uplink Carrier Indicator Field (UCIF) | K1 bits, where K1 ≥ 1 | Indicates UL Target Carrier |
| Timer of Uplink Switching (TULS) | K2 bits, where K2 ≥ 1 | Indicates No. of slots/frames of Target UL Carrier Transmission |
| PUCCH Resource Indicator | 3 | Identifies Time-Frequency resources for PUCCH |
| TPC Command for PUCCH | 2 | Transmit Power Control for PUCCH |
| PDSCH-to-HARQ Feedback Timing Indicator | K3 bits, where K3 ≥ 3 | Indicates the slot offset for PUCCH transmission w.r.t. the last PDSCH transmission |
| Resource configuration for UL reference signal (RCURS) transmitted on the switched UL carrier | K4 bits, where K4 > 1 | Self-Explanatory |
| Reserved | | |

PHYSICAL DOWNLINK CONTROL CHANNEL (PDCCH) ORDERED UPLINK CARRIER SWITCHING FOR HALF-DUPLEX FREQUENCY DIVISION DUPLEX (HD-FDD) USER EQUIPMENT

CROSS-REFERENCE TO RELATED APPLICATIONS

This application for patent claims priority to and the benefit of provisional patent application No. 63/023,720 entitled "Physical Downlink Control Channel (PDCCH) Ordered Uplink Carrier Switching for Half-Duplex Frequency Division Duplex (HD-FDD) User Equipment" filed in the United States Patent and Trademark Office on May 12, 2020, the entire content of which is incorporated herein by reference as if fully set forth below in its entirety and for all applicable purposes.

TECHNICAL FIELD

The technology discussed below relates generally to wireless communication systems, and more particularly, to switching of carrier frequencies used by half-duplex frequency division duplex (HD-FDD) user equipment in a wireless network.

INTRODUCTION

The use of reduced capability user equipment finds promise in use cases where latency requirements are not as strict as those imposed on, for example, ultra-reliable low latency communication (URLLC) devices. Reduced complexity may lower cost, and relaxed requirements may lead to improved battery life.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a scheduling entity is described. The method includes receiving, from a half-duplex frequency division duplex (HD-FDD) user equipment (UE), an initial attach request on a first uplink carrier of a primary cell (Pcell), entering into a radio resource control (RRC) connected state with the HD-FDD UE, determining an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer, and transmitting downlink control information (DCI) allocating to the HD-FDD UE the target uplink carrier for the amount of time to the HD-FDD UE.

In another example, a scheduling entity in a wireless communication network is described. The scheduling entity is described as having a wireless transceiver, a memory, and a processor communicatively coupled to the wireless transceiver and the memory. According to one aspect, the processor and the memory are configured to receive, from a half-duplex frequency division duplex (HD-FDD) user equipment (UE), an initial attach request on a first uplink carrier of a primary cell (Pcell), enter into a radio resource control (RRC) connected state with the HD-FDD UE, determine an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer, and transmit downlink control information (DCI) allocating to the HD-FDD UE the target uplink carrier for the amount of time to the HD-FDD UE.

According to one aspect, a scheduling entity in a wireless communication network may include means for receiving, from a half-duplex frequency division duplex (HD-FDD) user equipment (UE), an initial attach request on a first uplink carrier of a primary cell (Pcell), means for entering into a radio resource control (RRC) connected state with the HD-FDD UE, means for determining an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer, and means for transmitting downlink control information (DCI) allocating to the HD-FDD UE the target uplink carrier for the amount of time to the HD-FDD UE.

In another example, an article of manufacture for use by a scheduling entity in a wireless communication network is described. The article of manufacture is described as including a non-transitory computer-readable medium having stored therein instructions executable by one or more processors of the wireless communication device. In one example, the instructions are described as including instructions to receive, from a half-duplex frequency division duplex (HD-FDD) user equipment (UE), an initial attach request on a first uplink carrier of a primary cell (Pcell), enter into a radio resource control (RRC) connected state with the HD-FDD UE, determine an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer, and transmit downlink control information (DCI) allocating to the HD-FDD UE the target uplink carrier for the amount of time to the HD-FDD UE.

In still another example, a method of wireless communication at a half-duplex frequency division duplex user equipment (HD-FDD UE) is described. The method includes communicating with a scheduling entity via a first uplink carrier of a primary cell (PCell), receiving, from a scheduling entity, a downlink control information (DCI) message that includes an allocation of a target uplink carrier, that is different from the first uplink carrier, and includes an amount of time allocated for an uplink transmission on the target uplink carrier, switching from the first uplink carrier of the Pcell to the target uplink carrier, and transmitting, over the target uplink carrier, data stored in a buffer of the HD-FDD UE to the scheduling entity during the time allocated for the uplink transmission.

According to one aspect, a half-duplex frequency division duplex (HD-FDD) user equipment (UE) in a wireless communication network, is described as including a wireless transceiver, a memory, and a processor communicatively coupled to the wireless transceiver and the memory. In one example the processor and the memory are configured to communicate with a scheduling entity via a first uplink carrier of a primary cell (Pcell), receive, from a scheduling entity, a downlink control information (DCI) message that includes an allocation of a target uplink carrier, that is different from the first uplink carrier, and includes an amount of time allocated for an uplink transmission on the target uplink carrier, switch from the first uplink carrier of the Pcell to the target uplink carrier, and transmit, over the target uplink carrier, data stored in a buffer of the HD-FDD UE to the scheduling entity during the time allocated for the uplink transmission.

According to another aspect, a half-duplex frequency division duplex (HD-FDD) user equipment (UE) in a wireless communication network is described as including means for communicating with a scheduling entity via a first uplink carrier of a primary cell (PCell), means for receiving, from a scheduling entity, a downlink control information (DCI) message that includes an allocation of a target uplink carrier, that is different from the first uplink carrier, and includes an amount of time allocated for an uplink transmission on the target uplink carrier, means for switching from the first uplink carrier of the Pcell to the target uplink carrier, and means for transmitting, over the target uplink carrier, data stored in a buffer of the HD-FDD UE to the scheduling entity during the time allocated for the uplink transmission.

In still another aspect, an article of manufacture for use by a half-duplex frequency division duplex (HD-FDD) user equipment (UE) in a wireless communication network is described as including a non-transitory computer-readable medium having stored therein instructions executable by one or more processors of the wireless communication device. In one example, the instructions are described as including instructions to communicate with a scheduling entity via a first uplink carrier of a primary cell (PCell), receive, from a scheduling entity, a downlink control information (DCI) message that includes an allocation of a target uplink carrier, that is different from the first uplink carrier, and includes an amount of time allocated for an uplink transmission on the target uplink carrier, switch from the first uplink carrier of the Pcell to the target uplink carrier, and transmit, over the target uplink carrier, data stored in a buffer of the HD-FDD UE to the scheduling entity during the time allocated for the uplink transmission.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 8 is a block diagram illustrating an example of a hardware implementation of a scheduling entity employing a processing system according to some aspects of the disclosure.

FIG. 11 is an example of a modified or repurposed DCI format 1_0, with a CRC scrambled by an HD-FDD UE specific identifier, for a PDCCH order table according to some aspects of the disclosure.

DETAILED DESCRIPTION

Figure 1:
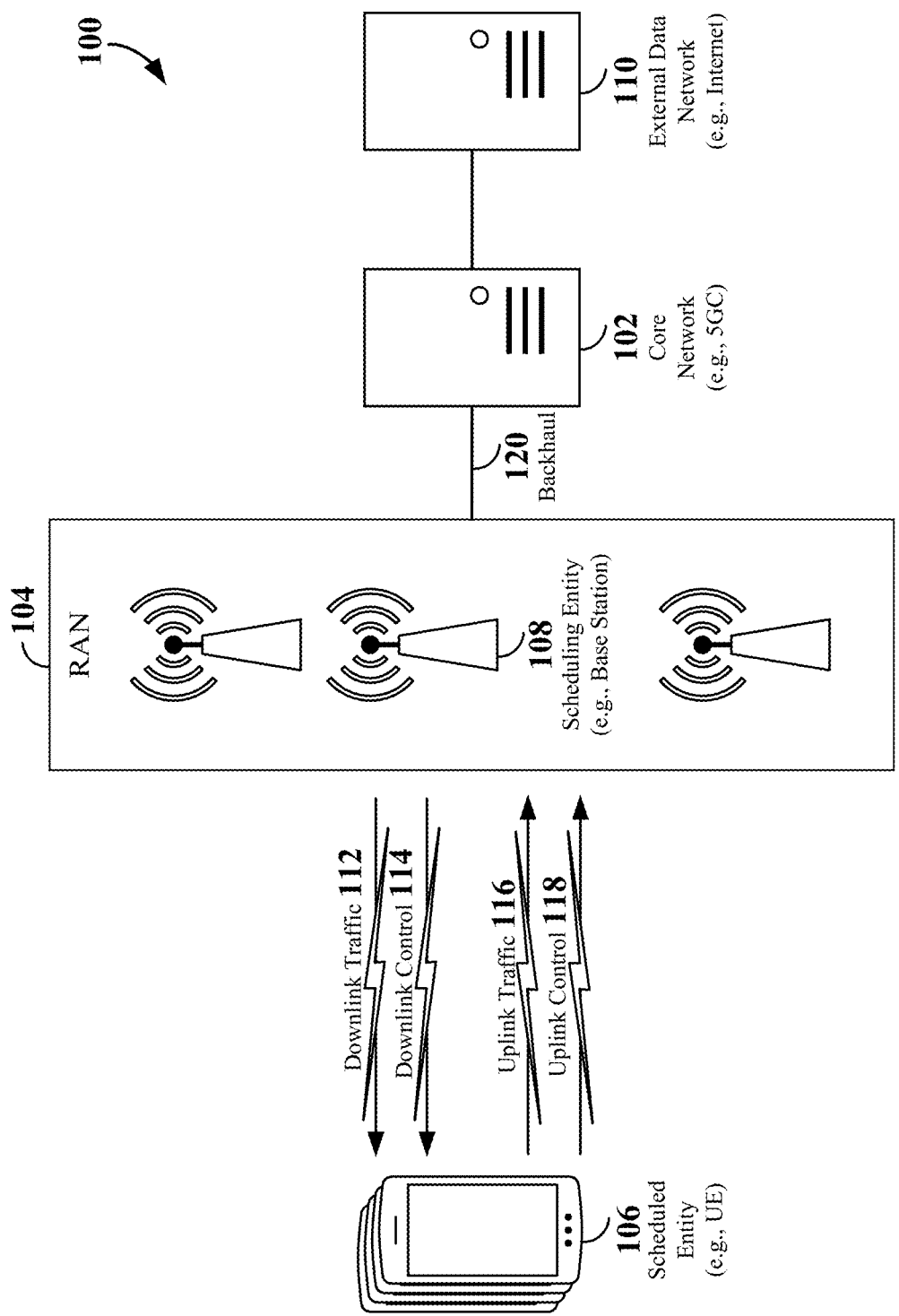
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The number of low-cost, reduced-capability HD-FDD UEs accessing wireless networks is expected to increase each year. The frequency spectrum available for these types of devices is limited. If many HD-FDD UEs attempt to use one uplink carrier frequency to access a wireless network, the quality of service (QoS) for all of the UEs may degrade. Enabling a scheduling entity (e.g., a network access node, an eNB, a gNB) to efficiently manage the uplink channels used by these types of devices may result in stronger wireless networks that efficiently balance load and manage inter/intraband interference.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
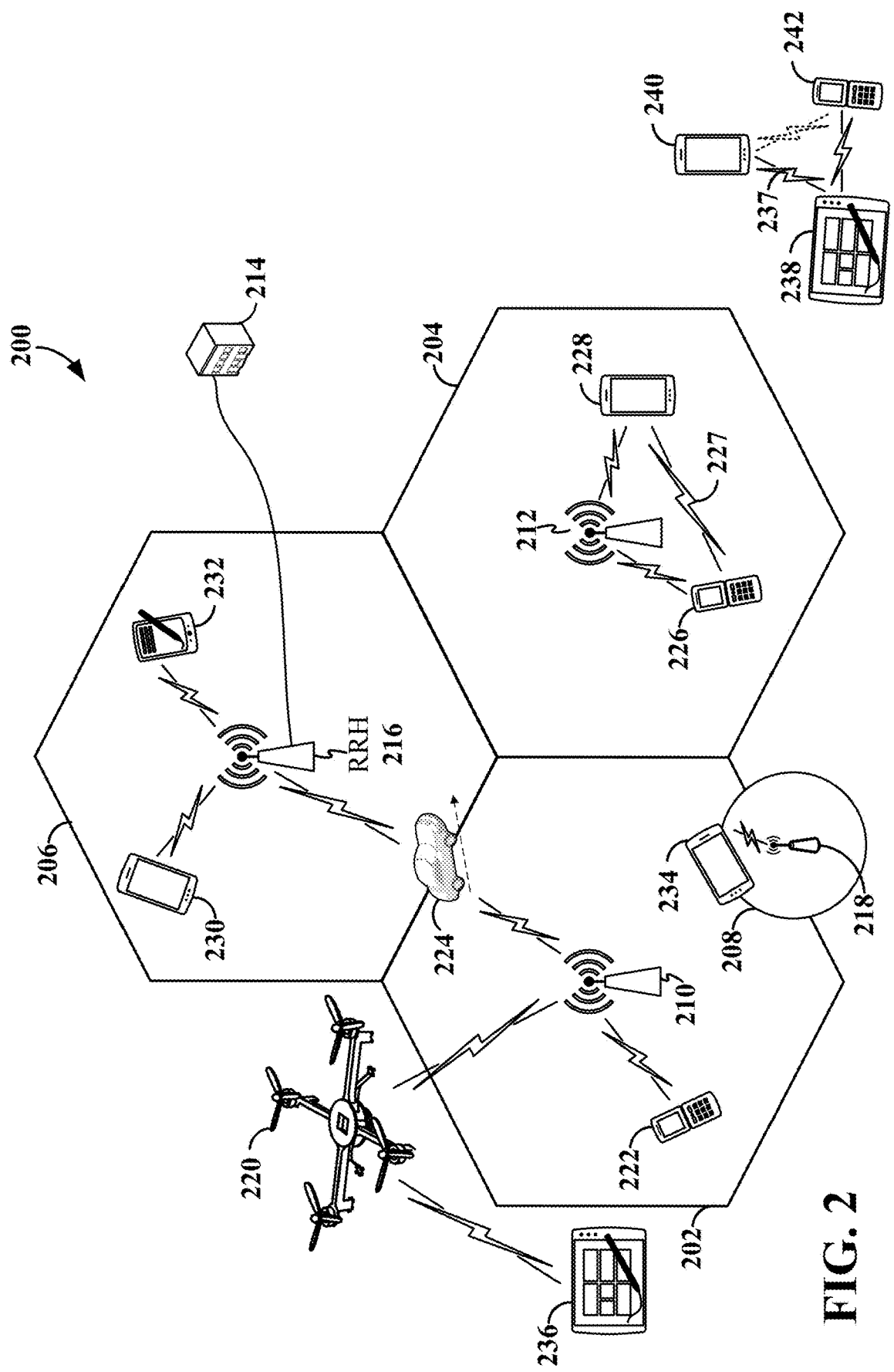
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
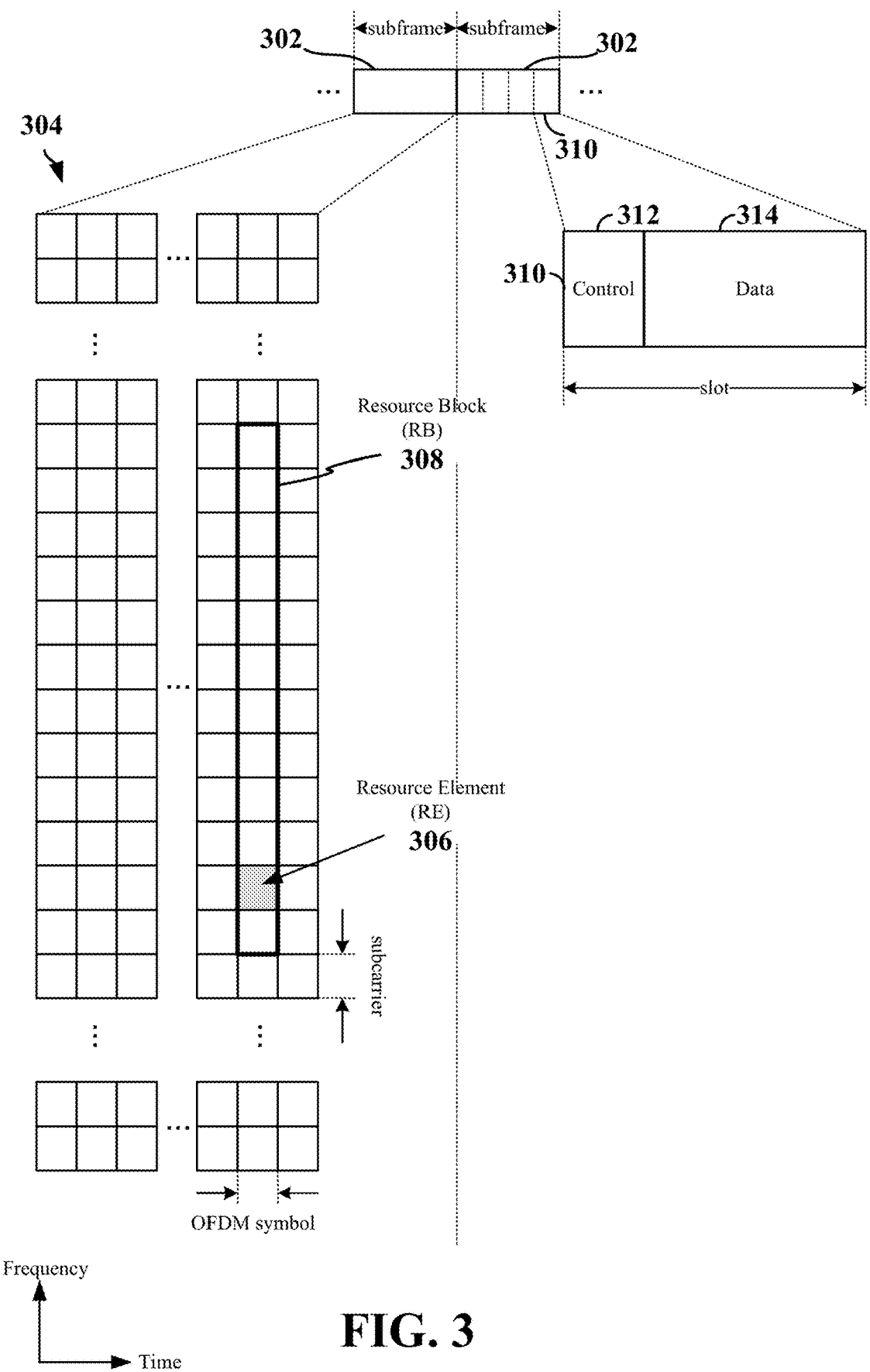
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
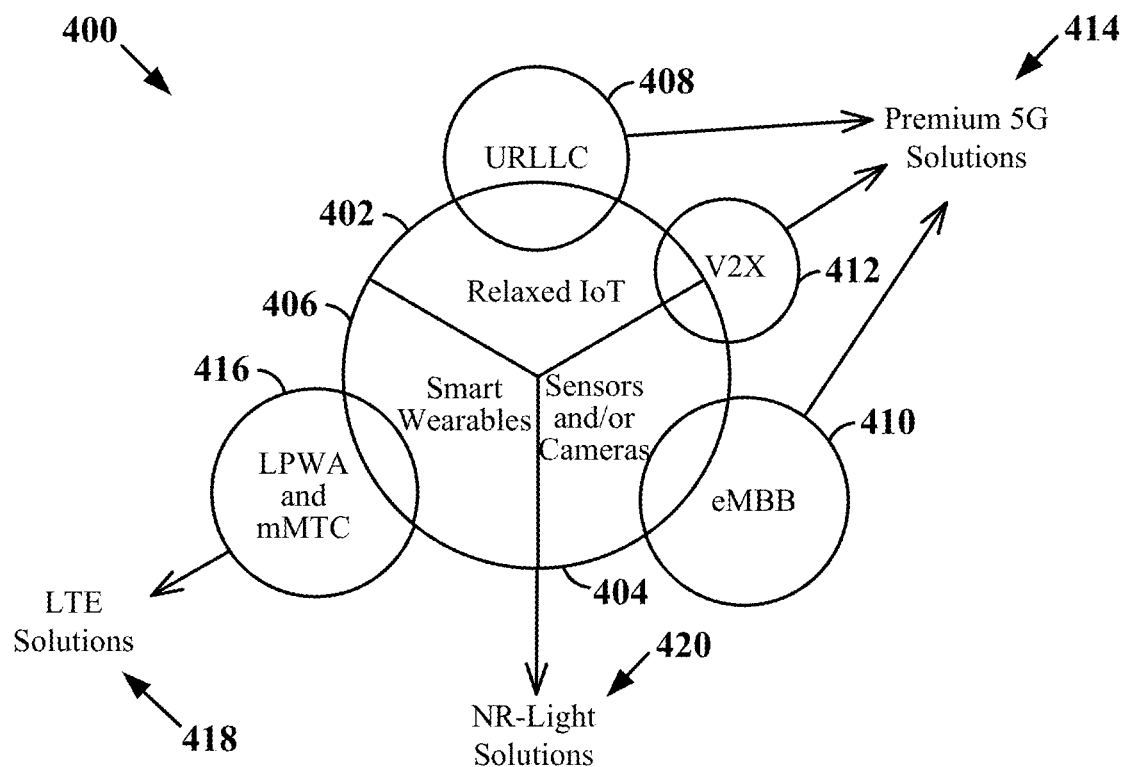
FIG. 4 is a Venn diagram illustrating several categories of devices and/or systems and one example of their alignment with various traffic types and implementation solutions in wireless communication networks according to some aspects of the disclosure.

FIG. 4 is a Venn diagram 400 illustrating several categories of devices and/or systems and one example of their alignment with various traffic types and implementation solutions in wireless communication networks according to some aspects of the disclosure. The categories of devices and/or systems, traffic types, and implementation solutions are illustrated for exemplary and non-limiting purposes. Other categories of devices and/or systems, traffic types, and implementation solutions exist and are known to those of skill in the art. Furthermore, the relationships, proportionalities, and locations of the various categories of devices and/or systems and traffic types are exemplary and non-limiting. For example, while not depicted, some sensors and cameras 404 may require the use of the Ultra-Reliable Low Latency Communication (URLLC) 408 traffic type. As one example, sensors and/or cameras used in conjunction with surgery or latency sensitive aspects of power generation (for example, monitoring of instruments and video feed at a nuclear power plant) may require transmission via the URLLC 408 traffic type. Three categories of devices and/or systems are illustrated: relaxed Internet of Things (IoT) 402; sensors and/or cameras 404; and smart wearables 406. These categories are well known in the art and will not be described herein for the sake of brevity.

As shown, the relaxed IoT 402 category may tend to fit generally with the URLLC 408 traffic type. The sensors and/or cameras 404 category may tend to fit generally with the enhanced Mobile Broadband (eMBB) 410 traffic type. Aspects of both the relaxed IoT 402 category and the sensors and/or cameras 404 category tend to fit generally with Vehicle-to-Everything (V2X) 412 traffic type. The smart wearables 406 category may tend to fit generally with the Low-Power Wide-Area (LPWA) and massive Machine Type Communications (mMTC) 414 traffic types. These traffic types are also well known in the art and will not be described for the sake of brevity. Of interest is the direction of implementation solutions related to the various traffic types shown (which again are only shown for illustrative and non-limiting purposes as other traffic types and other implementation solutions may be known to those of skill in the art).

By way of example, URLLC 408, eMBB 410, and V2X 412 traffic types may be supported by the most recent radio types and RAN communication networks. The hardware and software solutions implementing these radio types and RAN communication networks may be referred to as "premium 5G" solutions 414. Premium 5G solutions 414 may have radios that may be newer and may have a relatively high level of complexity in both electrical design, software design, and hardware realization. On the other hand, LPWA and mMTC 416 traffic types may tend to be supported by Long Term Evolution (LTE) solutions 418. The LTE solutions 418 may be implemented in existing or new radio types and RAN communication networks. Because the LTE solutions 418 may have been realized in the more recent past, their implementations may be better known and may be less complex and less costly than those of the premium 5G solutions 414.

There may be a need for the communication standards presently referred to as 5G or 5G-NR to be scaled and deployed (in response to an ever-growing demand for 5G) in efficient and cost-effective ways. Solutions directed toward filling this need may be referred to herein as New Radio-Light (NR-Light) 420 solutions (also referred to as NR-Lite, or NR-Reduced Capability (NR-RedCap) solutions). NR-Light 420 solutions may be implemented in a scheduled entity (which may be referred to herein as a wireless communication device, an NR-Light wireless communication device, an NR-RedCap UE, or an HD-FDD UE) as well as in scheduling entities (e.g., network access nodes, base stations, eNBs, gNBs).

To meet the challenge of the NR-Light 420 solution, scheduled entities may have smaller bandwidth, fewer antennas, relaxed peak throughput, relaxed latency, and/or relaxed reliability requirements (e.g., all with respect to, for example, Premium 5G 414 solutions and/or LTE solutions 418). The smaller bandwidth, fewer antennas, relaxed throughput, latency and reliability permits implementation of stricter efficiency requirements in the areas of, for example, decreased power consumption, longer battery life, and/or reduced system overhead (again, all in comparison to, for example, Premium 5G 414 solutions and/or LTE solutions 418). Implementing these types of changes may allow for a reduction in the cost of hardware and/or software for the exemplary types of scheduled entities configured for NR-Light 420 solutions (again, in comparison to, for example, Premium 5G 414 solutions and/or LTE solutions 418).

NR-Light 420 solutions may be directed to use cases in, for example, smart wearables 406 (e.g., smart watches), sensors and/or cameras 404 (e.g., industrial wireless sensor networks (IWSN) and/or surveillance cameras), and low-end smartphones (not shown) to mention but a few. These use cases are exemplary and non-limiting. The NR-Light 420 solutions for scheduled entities include using a half-duplex (HD) frequency division duplex (HD-FDD) duplexing mode according to some aspects of the disclosure.

Figure 5:
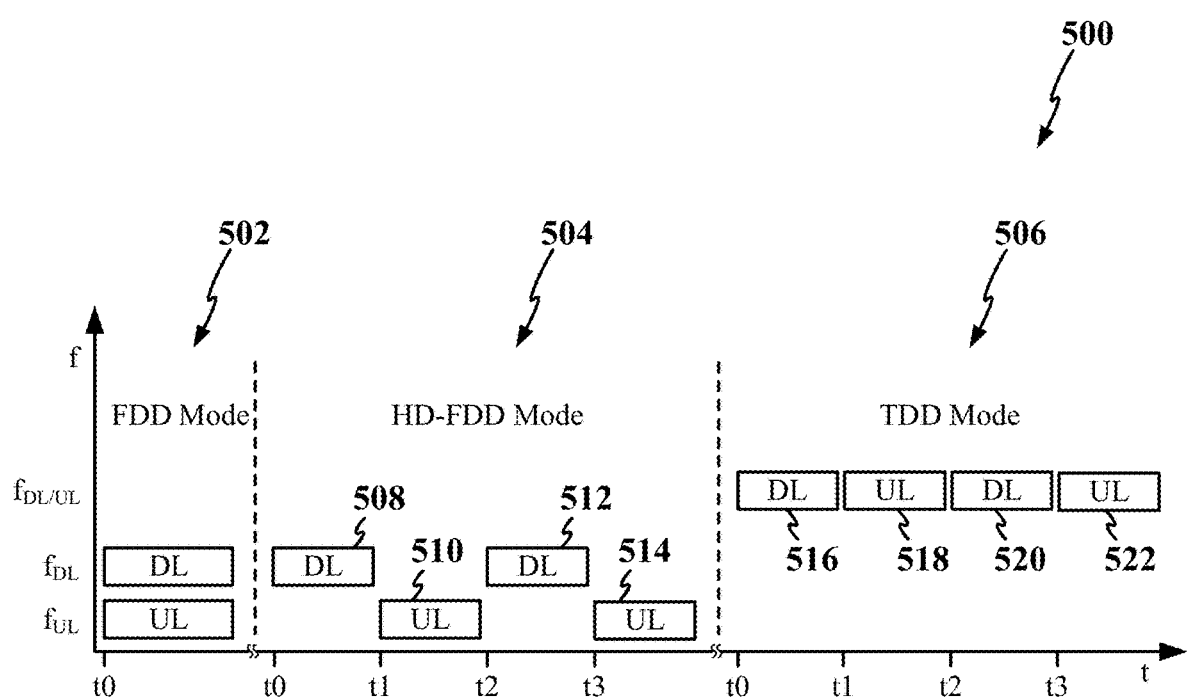
FIG. 5 is graph of time vs. frequency that illustrates differences between full-duplex (FD) frequency division duplex (FD-FDD) or simply FDD, half duplex frequency division duplex (HD-FDD), and time division duplex (TDD) duplexing modes according to some aspects of the disclosure.

FIG. 5 is graph 500 that illustrates differences between full-duplex (FD) frequency division duplex (FD-FDD) or simply FDD 502, HD-FDD 504, and time division duplex (TDD) 506 duplexing modes according to some aspects of the disclosure. In the example shown in FIG. 5, time is illustrated along the horizontal axis, while frequency is illustrated along the vertical axis. According to some NR-Light 420 solutions described herein, a scheduled entity (e.g., HD-FDD UE 900 of FIG. 9, such as a NR-Light wireless communication device) may employ HD-FDD instead of FDD or TDD, where FDD or TDD may, in contrast, be employed by Premium 5G 414 solutions and/or LTE solutions 418. As depicted in FDD mode 502, uplink and downlink transmissions and/or receptions may occur at the same time, to. For example, uplink transmissions may occur at a first center frequency, $f_{UL}$, while downlink transmissions occur at a second center frequency, $f_{DL}$. As $f_{UL}$ and $f_{DL}$ are different, the uplink and downlink can be transmitted and/or received at the same time without interfering with one another. As depicted in HD-FDD mode 504, a dedicated uplink carrier is found at the first center frequency, $f_{UL}$, and a dedicated downlink carrier is found at the second center frequency, $f_{DL}$, respectively; however, uplink and downlink occur at alternating times. In the illustrated example, a first downlink 508 traffic or control transmission occurs at to, a first uplink 510 traffic or control transmission occurs at time $t_1$, a second downlink 512 traffic or control transmission occurs at $t_2$, and a second uplink 514 traffic or control transmission occurs at time $t_3$ (where $t_0<t_1<t_2<t_3$). Because the various uplink and downlink transmissions occur on two separate frequencies and because the various uplink and downlink transmissions occur at different times, they do not interfere with one another. As also depicted in TDD mode 506, the various uplink and downlink transmissions or receptions all occur at a third center frequency, $f_{DL/UL}$; however, the uplink and downlink transmissions or receptions alternate in time. In the illustrated example, a first downlink 516 traffic or control transmission occurs at to, a first uplink 518 traffic or control transmission occurs at time $t_1$, a second downlink 520 traffic or control transmission occurs at $t_2$, and a third uplink 522 traffic or control transmission occurs at time $t_3$ (where to $<t_1<t_2<t_3$). Even though the various uplink and downlink transmissions occur at one center frequency, they do not interfere with one another because the various uplink and downlink transmissions occur at different times.

For reference, the radio frequency spectrum used by LTE networks ranges from about 700 MHz to about 2.7 GHz. The frequency spectrum used by 5G networks is split into two overarching bands. A first band spans from about 410 MHz to about 7.125 GHz and is referred to as the FR1 band or the sub-6 band (even though it includes some frequencies above 6 GHz). FR1 includes the frequency spectrum for the LTE networks and standards for LTE and 5G are both promulgated by the Third Generation Partnership Project (3GPP). A second band spans from about 24.250 GHz to about 52.600 GHz and is referred to as the FR2 band or the millimeter wave (mmWave) band.

Also, for reference, 5G NR FR1 frequency bands n1-n28 (e.g., channels n1-n28) use FDD, where each channel (n1-n28) uses separate frequency bands for uplink and downlink. FR1 frequency bands n34-n74 and n77-n79 use TDD, where each channel (n34-n74 and n77-n79) uses the same frequency band for both uplink and downlink. FR1 frequency bands n75-n76 are reserved for supplementary downlink (SDL) and n80-n86 are reserved for supplementary uplink (SUL). SDL bands n75-n76 each have a unique center frequency and span different frequency ranges in comparison to the SUL bands n80-n86. The SDL channels are identified as using SDL duplex mode while the SUL channels are identified as having a SUL duplex mode. 5G NR FR2 frequency bands n257-n261 use TDD but each channel (e.g., n257-n261) uses a separate frequency band for uplink and downlink.

At least one way to realize the NR-Light 420 solutions for smart wearables 406, sensors and/or cameras 404, or other devices, products, and/or systems may be to implement NR-Light 420 solutions in wireless communication devices that are configured to operate under the HD-FDD duplex mode. HD-FDD UEs may operate in the 5G FR1 band. The HD-FDD UEs may be configured with low cost and low complexity single-pole-double-throw (SPDT) switches. The SPDT switches may replace the relatively higher cost and higher complexity multiplexors that are typically found in wireless communication devices used for Premium 5G 414 solutions and LTE solutions 418, for example.

As will be understood by those of skill in the art, a multiplexor may be coupled to a transceiver, between a transmitter and receiver pair and an antenna. The multiplexor may allow the transceiver to simultaneously receive control and/or traffic from, and transmit control and/or traffic to, the antenna. According to such an implementation, FDD communication can be realized.

An SPDT switch may replace the multiplexor. The SPDT switch may be coupled at a first port (a first throw) to a transmit port of a transceiver, at a second port (a second throw) to a receive port of the transceiver, and at a third port (the pole) to the antenna. The SPDT switch allows the transceiver, at any given time, to either receive control and/or traffic from, or transmit control and/or traffic to, the antenna. The SPDT switch-equipped UE may operate as an HD-FDD UE.

According to some aspects, a scheduling entity may, for example, enable load balancing, address intra/inter-cell interference management, and provide coverage enhancement by dynamically switching an uplink carrier of an HD-FDD UE according to network conditions. The scheduling entity may cause this switching to occur by using a modified or repurposed downlink carrier information (DCI) message.

As known to those of skill in the art, the present (un-modified/un-repurposed) fields of the DCI format 1_0, with a CRC scrambled by a Cell-Radio Network Temporary Identifier (C-RNTI), for a PDCCH order are given in Table 1, below. The C-RNTI is one example of a user equipment (e.g., a UE, a scheduled entity) specific identifier.

TABLE 1

| Field | No. of Bits | Description |
| --- | --- | --- |
| Identifier for DCI formats | 1 | Differentiates DCI format 0_0 and DCI format 1_0. For DCI format 1_0, this field is set to "1" |
| Frequency Domain Resource Assignment (FDRA) | Number of bits determined by the number of resource blocks in the downlink bandwidth part. | All bits set to "1" |
| Random Access Preamble Index | 6 | RA Preamble index ranging from 0-63 |
| UL/SUL Indicator | 1 | "0" for Normal UL, "1" for SUL (See Note 1 below) |
| SS/PBCH index | 6 | See Note 2 below |
| PRACH Mask Index | 4 | See Note 3 below |
| Reserved bits | 10 | |

Note 1:
If the value of the "Random Access Preamble Index" is not all zeros and if the UE is configured with SUL, this field indicates whether PRACH should be sent on the normal uplink or SUL; otherwise, this field is reserved.
Note 2:
If the value of the "Random Access Preamble Index" is not all zeros, this field indicates the SS/PBCH that shall be used to determine the RACH occasion for the PRACH transmission; otherwise, this field is reserved.
Note 3:
If the value of the "Random Access Preamble Index" is not all zeros, this field indicates the RACH occasion associated with the SS/PBCH indicated by "SS/PBCH Index" for the PRACH transmission; otherwise, this field is reserved.

Various aspects described herein may modify or repurpose the above depicted DCI such that some of the fields and associated bits currently used may no longer be required. Therefore, these fields can be modified or repurposed according to some aspects described herein.

An HD-FDD UE may obtain a C-RNTI after the HD-FDD UE is RRC connected with the scheduling entity. In other words, after the scheduling entity and the HD-FDD are in an RRC connected state. Once an HD-FDD UE and scheduling entity enter into an RRC connected state, the scheduling entity may know, for example, the identity of the HD-FDD UE, the capability of the HD-FDD UE, and an amount of data stored in a buffer of the HD-FDD UE (awaiting uplink). The scheduling entity may then use this knowledge, together with knowledge of other HD-FDD UEs in the RRC connected state, to determine a target uplink carrier for each given HD-FDD UE and an amount of time to allocate to each given HD-FDD UE to allow the given HD-FDD UE sufficient time to upload the data stored in its buffer. The scheduling entity may then convey the target uplink carrier and time allocation to the UE via a modified or repurposed DCI for the PDCCH order, such as a modified or repurposed DCI format 1_0, with a CRC scrambled by the C-RNTI of the UE (e.g., the C-RNTI of the HD-FDD UE), for the PDCCH order. The C-RNTI is one example of an HD-FDD UE specific identifier.

In addition, at present, there is only one used case for the DCI format 1_0 with a CRC scrambled by the C-RNTI for the PDCCH order. According to that use case, upon receiving the PDCCH order, the HD-FDD UE may trigger a random access procedure. Accordingly, an HD-FDD UE that receives the modified or repurposed DCI format PDCCH order may only need to parse the DCI to determine if it is being used to trigger the random access procedure or if it is being used to order UL carrier switching according to some aspects described herein. HD-FDD UEs that are not expecting to have carrier switching and do not need to perform a random access procedure may not need to decode the DCI (as it would not be pertinent to such UEs), and therefore may save power (by avoiding the process of decoding). In this way, the scheduling entity may coordinate the uplink transmissions of a plurality of HD-FDD UEs and achieve load balancing, address intra/inter-cell interference management, and provide for general coverage enhancement for the plurality of HD-FDD UEs.

It is expected that that number of HD-FDD UEs may be large, but the frequency band for the HD-FDD UEs may be narrow (e.g., 5 MHz, 10 MHz, or 15 MHz); accordingly, if a large number of HD-FDD UEs compete to transmit on the same carrier, the quality of service (QoS) for any given HD-FDD UE may not be guaranteed. Therefore, the aspects described herein allow a scheduling entity to configure an HD-FDD UE, once the HD-FDD UE is RRC connected with the scheduling entity (e.g., after the HD-FDD UE obtains its C-RNTI), to dynamically switch the uplink carrier of the HD-FDD UE from the first uplink carrier of a primary cell (Pcell) to another carrier (e.g., a target uplink carrier), thereby freeing the primary carrier for use by a different HD-FDD UE. Accordingly, the aspects described herein allow a scheduling entity to enable load balancing across the frequency band allocated to the HD-FDD UEs, address intra/inter-cell interference management among the HD-FDD UEs and provide for general coverage enhancement for a plurality of HD-FDD UEs.

In some examples, after the initial attach on a first uplink carrier Pcell and following the uplink transmission on the PDCCH ordered target carrier (e.g., a carrier other than the first uplink carrier of the Pcell), the HD-FDD UE may automatically change its uplink carrier frequency back to the first uplink carrier of the Pcell and may, for example, enter a sleep mode. Thereafter, when the HD-FDD UE wakes from the sleep mode, it will be ready to reattach over the first uplink carrier of the Pcell and monitor a primary downlink carrier for a DCI including a PDCCH ordered frequency change.

Figure 6:
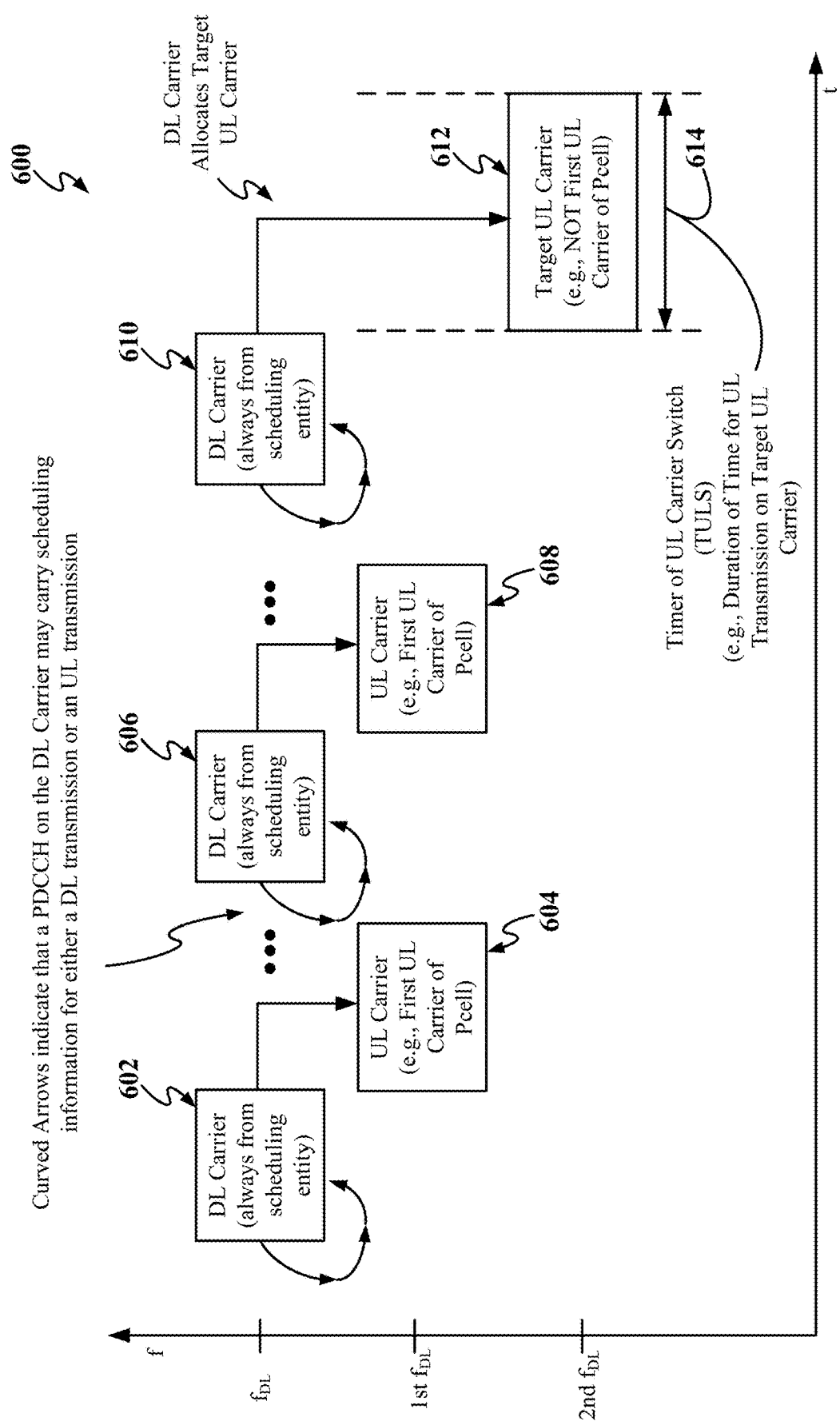
FIG. 6 is another graph of time vs. frequency that illustrates allocations made by a scheduling entity on a downlink (DL) carrier according to some aspects of the disclosure.

FIG. 6 is another graph 600 that illustrates allocations made by a scheduling entity on a downlink (DL) carrier according to some aspects of the disclosure. In the example shown in FIG. 6, time is illustrated along the horizontal axis and frequency is illustrated along the vertical axis. The curved arrows that both emanate and terminate on the DL carrier 602, 606, 610 indicate that a PDCCH on the DL carrier 602, 606, 610 may carry scheduling information for either a DL transmission or a UL transmission. As illustrated, the scheduling entity may provide scheduling information on the DL carrier 602, 606 for the uplink carrier 604, 608. The UL carrier 604, 608 may be a first UL carrier of a primary cell (Pcell). In some examples, the scheduling entity may provide scheduling information on the DL carrier 610 for a target uplink carrier 612; however, the target uplink carrier 612 may not be the first UL carrier of the Pcell. Instead, the target uplink carrier 612 may be at a frequency that is different from the first UL carrier of the Pcell. An uplink carrier indicator field (UCIF) of a modified or repurposed DCI format 1_0 with cyclic redundancy check (CRC) scrambled by C-RNTI (of an HD-FDD UE) for the PDCCH order may indicate the target UL carrier frequency (which is different from the first UL carrier frequency of the Pcell). In one example, the modified or repurposed DCI format 1_0 with cyclic redundancy check (CRC) scrambled by C-RNTI (of an HD-FDD UE) for the PDCCH order may be a DCI (or a DCI format, or a DCI format 1_0) with a CRC scrambled by an HD-FDD UE specific identifier for the PDCCH order. The modified or repurposed DCI format 1_0 with the CRC scrambled by C-RNTI for the PDCCH order may include a timer of UL switching (TULS) field that indicates the duration 614 of the UL transmission allocated by the scheduling entity to the HD-FDD UE.

Figure 7:
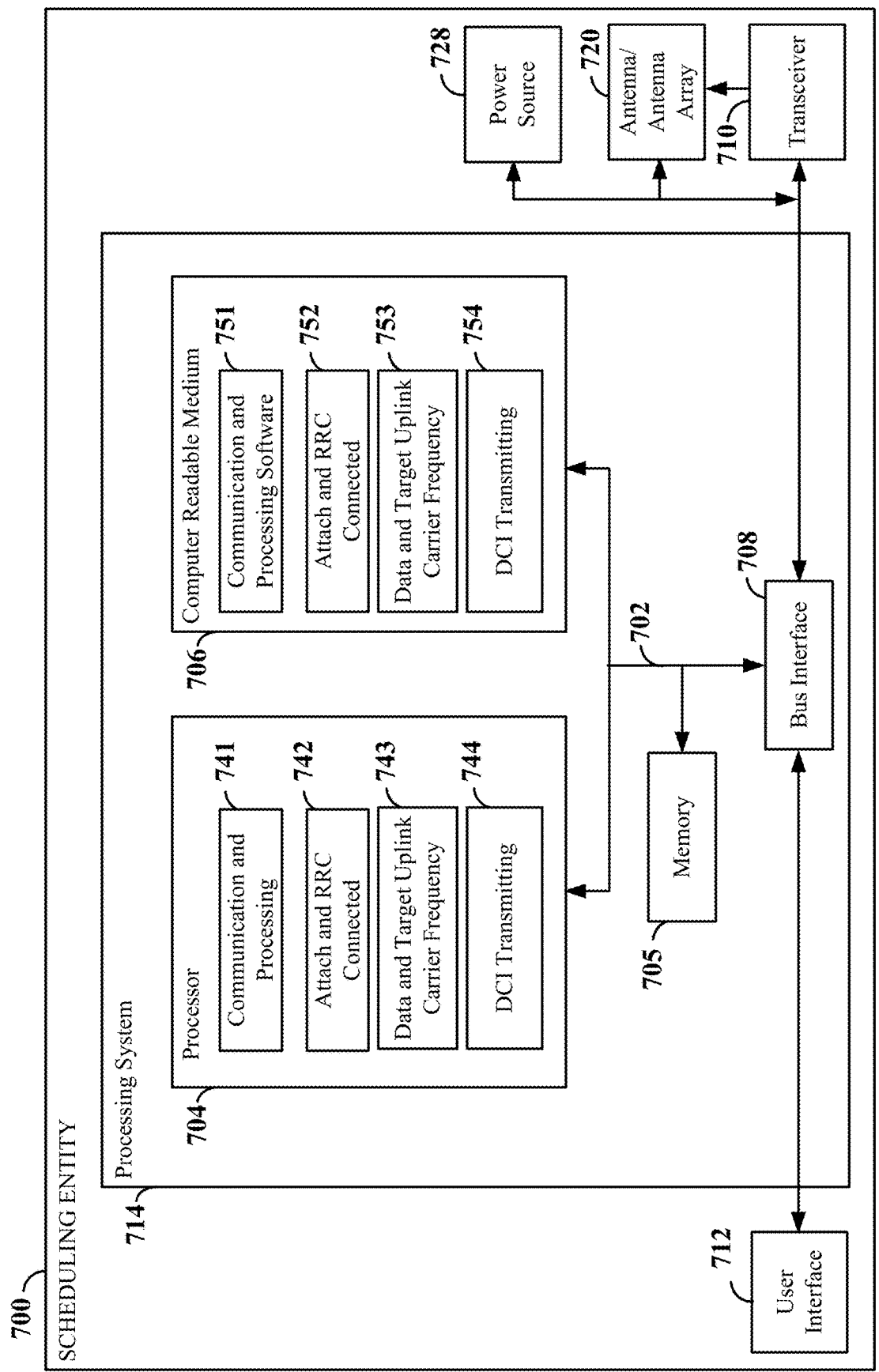
FIG. 7 is a block diagram illustrating an example of a hardware implementation of a scheduling entity (e.g., a network access node, a base station) employing a processing system according to some aspects of the disclosure.

FIG. 7 is a block diagram illustrating an example of a hardware implementation of a scheduling entity 700 (e.g., a network access node, a base station, etc.) employing a processing system 714 according to some aspects of the disclosure. The scheduling entity 700 may be a base station (e.g., eNB, gNB, network access node) as illustrated in any one or more of FIGS. 1-2.

In accordance with various aspects of the disclosure, an element, or any portion of an element, or any combination of elements may be implemented with a processing system 714 that includes one or more processors, such as processor 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the methods or processes described and illustrated, for example, in FIG. 6 and/or FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further.

A bus interface 708 provides an interface between the bus 702 and a transceiver 710. The transceiver 710 provides a means for communicating with various other apparatus over a transmission medium (e.g., air interface). The transceiver 710 may further be coupled to one or more antennas/antenna array/antenna module 720. The bus interface 708 further provides an interface between the bus 702 and a user interface 712 (e.g., keypad, display, touch screen, speaker, microphone, control features, etc.). Of course, such a user interface 712 is optional, and may be omitted in some examples. In addition, the bus interface 708 further provides an interface between the bus 702 and a power source 728 of the scheduling entity 700 or processing system 714.

One or more processors, such as processor 704, may be responsible for managing the bus 702 and general processing, including the execution of software stored on the computer-readable medium 706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 706. The software, when executed by the processor 704, causes the processing system 714 to perform the various processes and functions described herein for any particular apparatus.

The computer-readable medium 706 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product or article of manufacture. By way of example, a computer program product or article of manufacture may include a computer-readable medium in packaging materials. In some examples, the computer-readable medium 706 may be part of the memory 705. Those skilled in the art will recognize how best to implement the described functionality presented throughout this disclosure depending on the particular application and the overall design constraints imposed on the overall system. The computer-readable medium 706 and/or the memory 705 may also be used for storing data that is manipulated by the processor 704 when executing software.

In some aspects of the disclosure, the processor 704 may include communication and processing circuitry 741 configured for various functions, including, for example, communicating with a scheduled entity (e.g., an HD-FDD UE, an NR-Light wireless communication device), a network core (e.g., a 5G core network), other scheduling entities, or any other entity, such as, for example, local infrastructure or an entity communicating with the scheduling entity 700 via the Internet, such as a network provider. In some examples, the communication and processing circuitry 741 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 741 may be configured to receive and process uplink traffic and uplink control (e.g., similar to uplink traffic 116 and uplink control 118 of FIG. 1) and process and transmit downlink traffic and downlink control (e.g., similar to downlink traffic 112 and downlink control 114) via the antennas/antenna array/antenna module 720 and the transceiver 710. The communication and processing circuitry 741 may further be configured to execute communication and processing software 751 stored on the computer-readable medium 706 to implement one or more functions described herein.

In some aspects of the disclosure, the processor 704 may include attach and RRC connected circuitry 742 configured for various functions, including, for example, receiving, from a half-duplex frequency division duplex (HD-FDD)

user equipment (UE), an initial attach request on a first uplink carrier of a primary cell (Pcell), assigning a cell-radio network temporary identifier (C-RNTI) to the HD-FDD UE, and entering into a radio resource control (RRC) connected state with the HD-FDD UE. In some examples, the attach and RRC connected circuitry 742 may include one or more hardware components that provide the physical structure that performs processes related to performing receiving, from the half-duplex frequency division duplex (HD-FDD) user equipment (UE), the initial attach request on the first uplink carrier of the Pcell, assigning the C-RNTI to the HD-FDD UE, and entering into the radio resource control (RRC) connected state with the HD-FDD UE. The attach and RRC connected circuitry 742 may further be configured to execute attach and RRC connected software 752 stored on the computer-readable medium 706 to implement one or more functions described herein.

In some aspects of the disclosure, the processor 704 may include data and target uplink carrier frequency circuitry 743 configured for various functions, including, for example, determining an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer. In some examples, the data and target uplink carrier frequency circuitry 743 may include one or more hardware components that provide the physical structure that performs processes related to performing the determination of the amount of data waiting to be uploaded to the scheduling entity from the buffer of the HD-FDD UE, the target uplink carrier that is different from the first uplink carrier of the Pcell, and the amount of time to grant to the HD-FDD UE to upload the data from the buffer. The data and target uplink carrier frequency circuitry 743 may further be configured to execute data and target uplink carrier frequency software 753 stored on the computer-readable medium 706 to implement one or more functions described herein.

In some aspects of the disclosure, the processor 704 may include downlink control information (DCI) transmitting circuitry 744 configured for various functions, including, for example, a downlink control information (DCI) allocating to the HD-FDD UE the target uplink carrier for the amount of time and transmitting the DCI to the HD-FDD UE. In some examples, the DCI transmitting circuitry 744 may include one or more hardware components that provide the physical structure that performs processes related to performing the generation of the DCI that allocates the target uplink carrier for the amount of time to the HD-FDD UE and transmitting the DCI to the HD-FDD UE. The DCI transmitting circuitry 744 may further be configured to execute DCI transmitting circuitry software 754 stored on the computer-readable medium 706 to implement one or more functions described herein.

Figure 8:
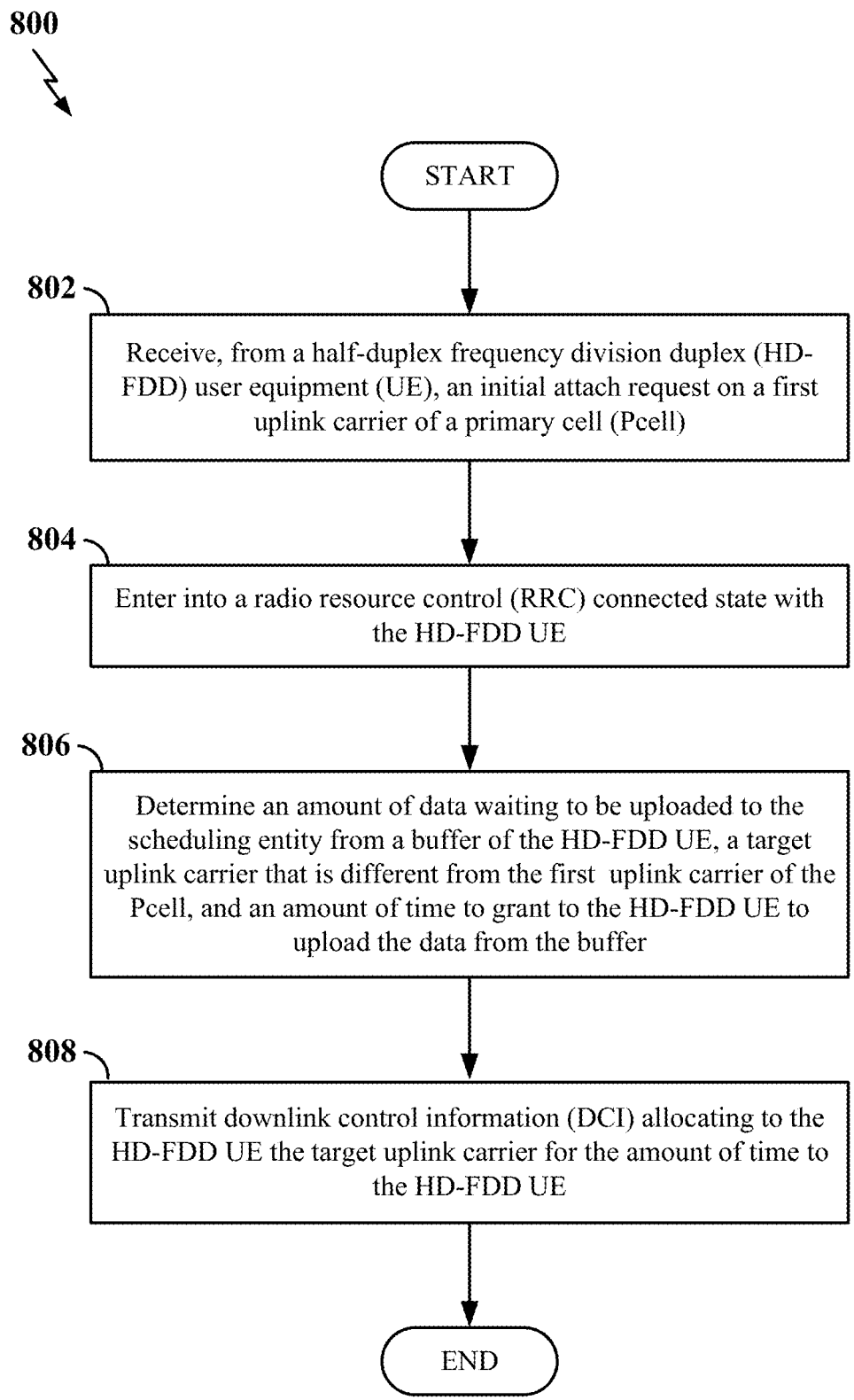
FIG. 8 is a flow chart illustrating an exemplary process 800 (e.g., a method) at scheduling entity (e.g., a base station, a network access node) for allocating resources to a FD-HDD UE according to some aspects of the disclosure.
Figure 9:
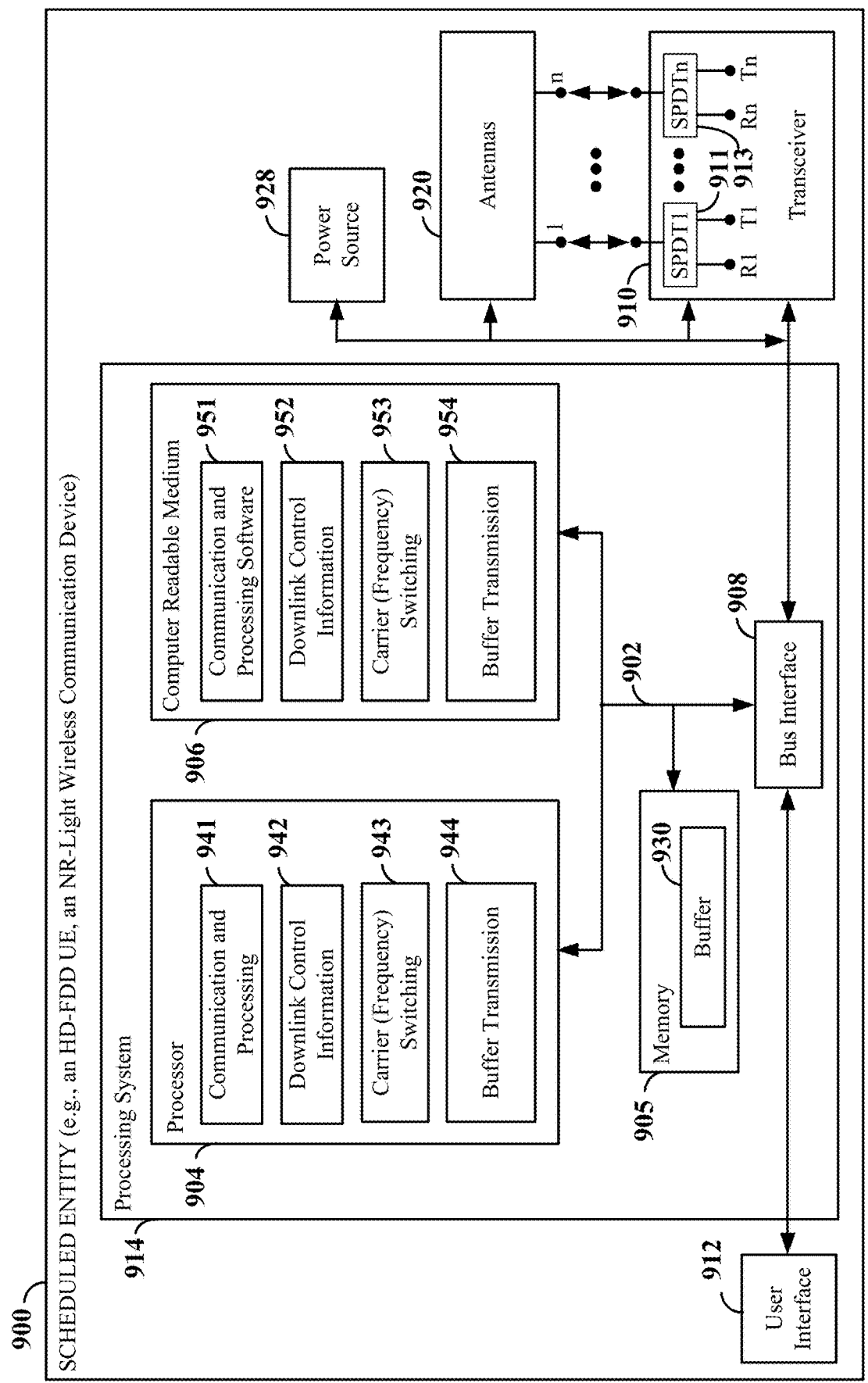
FIG. 9 is a block diagram illustrating an example of a hardware implementation of scheduled entity (e.g., a FD-HDD UE, a NR-Light wireless communication device) employing a processing system according to some aspects of the disclosure.

FIG. 8 is a flow chart illustrating an exemplary process 800 (e.g., a method) at scheduling entity (e.g., a base station, a network access node) for allocating resources to an FD-HDD UE, such as, for example, the HD-FDD UE 900 (the scheduled entity) of FIG. 9, according to some aspects of the disclosure. As described below, some or all illustrated features may be omitted in a particular implementation within the scope of the present disclosure, and some illustrated features may not be required for implementation of all examples. In some examples, the process 800 may be carried out by the scheduling entity 700 illustrated in FIG. 7. In some examples, the process 800 may be carried out by any suitable apparatus or means for carrying out the functions or algorithms described herein.

At block 802, a scheduling entity (e.g., scheduling entity 700 of FIG. 7) may receive, from a half-duplex frequency division duplex (HD-FDD) user equipment (UE) (e.g., similar to HD-FDD UE 900 of FIG. 9) an initial attach request on a first uplink carrier of a primary cell (Pcell). The first uplink carrier of the Pcell may also be referred to as the source uplink carrier. For example, the attach and RRC connected circuitry 742 and/or the transceiver 710, shown and described above in connection with FIG. 7, may provide the means for receiving, from the HD-FDD UE (e.g., similar to HD-FDD UE 900 of FIG. 9) an initial attach request on a first uplink carrier of a primary cell (Pcell). At block 804, the scheduling entity may enter into a radio resource control (RRC) connected state with the HD-FDD UE. In some examples, the scheduling entity may provide a cell-radio network temporary identifier (C-RNTI) to the HD-FDD UE. For example, the attach and RRC connected circuitry 742, shown and described above in connection with FIG. 7, may provide the means for entering into the radio resource control (RRC) connected state with the HD-FDD UE. At block 806, the scheduling entity may determine: an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer. For example, the data and target uplink carrier frequency circuitry 743, shown and described above in connection with FIG. 7, may provide the means for determining: the amount of data waiting to be uploaded to the scheduling entity from a buffer of the HD-FDD UE, the target uplink carrier that is different from the first uplink carrier of the Pcell, and the amount of time to grant to the HD-FDD UE to upload the data from the buffer. At block 808, the scheduling entity may transmit downlink control information (DCI), allocating to the HD-FDD UE the target uplink carrier for the amount of time, to the HD-FDD UE. For example, the DCI transmitting circuitry 744 and/or the transceiver 710, shown and described above in connection with FIG. 7, may provide the means for transmitting the downlink control information (DCI), allocating to the HD-FDD UE the target uplink carrier for the amount of time, to the HD-FDD UE.

According to some aspects, the scheduling entity may further configure or attach a DCI, with a cyclic redundancy check (CRC) scrambled by an HD-FDD UE specific identifier, for a physical downlink control channel (PDCCH) order. According one example, the scheduling entity may configure the DCI as a DCI format 1_0, with a cyclic redundancy check (CRC) scrambled by the C-RNTI, for a physical downlink control channel (PDCCH) order.

In some examples, the scheduling entity may further modify the DCI, with the CRC scrambled by the HD-FDD UE specific identifier, for the PDCCH order to include an uplink carrier indicator field (UCIF) that may indicate the target uplink carrier to the HD-FDD UE and/or modify the DCI, with the CRC scrambled by the HD-FDD UE specific identifier, for the PDCCH order to include a timer of uplink switching (TULS) field that may indicate the amount of time to the HD-FDD UE. In some examples, the scheduling entity may further modify the DCI format 1_0, with the CRC scrambled by the C-RNTI, for the PDCCH order to include an uplink carrier indicator field (UCIF) to indicate the target uplink carrier to the HD-FDD UE. The UCIF parameter may use an integer value, K1 (where K1≥1). K1 may indicate the target uplink carrier. K1 may be used as an index value such that when K1 is equal to 1, the target uplink carrier is understood to be at frequency 1, when K1 is equal to 2, target uplink carrier is understood to be at frequency 2, and so on. Therefore, to use the K1 value, the HD-FDD UE may need a table (e.g., a look-up table) that cross-references the K1 value with candidate UL carriers. The use of the table saves overhead, as the scheduling entity will only need to pass an index value, K1, to the HD-FDD UE (as opposed to passing an actual frequency value). The table may be agreed upon ahead of the time when a first UL carrier switch may occur. The HD-FDD UE and scheduling entity may therefore agree upon the contents of the table and follow the table when it comes time to decode the UCIF, identify the target UL carrier, and switch the UL carrier frequency from the first UL carrier of the Pcell to the target UL carrier identified by the value of K1. The table may be conveyed by, for example, a system information broadcast (SIB) in dedicated RRC signaling, or may be preconfigured in the HD-FDD UE by a network operator. By way of example, if a SIB conveys the table, all HD-FDD UEs receiving the SIB may use the same table. If dedicated RRC signaling conveys the table, each HD-FDD UE may have its own table (where the tables of various HD-FDD UEs may not all be the same).

In some examples, the scheduling entity may further modify the DCI format 1_0 with the CRC scrambled by the C-RNTI for the PDCCH order to include a timer of uplink switching (TULS) field to indicate the amount of time that the HD-FDD UE has to stay (and transmit) on the target UL carrier. When the time expires, the HD-FDD UE may switch the carrier frequency back to the first uplink carrier of the Pcell. In this way, there is no need for the scheduling entity to send another PDCCH order to command the HD-FDD UE to switch back to the first uplink carrier of the Pcell (e.g., the source uplink carrier); the switch back is controlled by the timer and the value of the TULS field. The value of the TULS may be an integer, K2 (where K2≥1). The units of K2 may be, for example, slots or frames. The units of K2 may be established by the configuration of the HD-FDD UE and may be network operator, for example, specific.

According to some aspects, the scheduling entity may modify the DCI, with the CRC scrambled by the HD-FDD UE specific identifier, for the PDCCH order to include a physical uplink control channel (PUCCH) resource indicator that may be used to select a PUCCH resource from a resource list within a PUCCH resource set configured by a radio resource control (RRC) layer. In some examples, the PUCCH resource indicator may have a predetermined number of bits. As a further example, the scheduling entity may modify the DCI format 1_0, with the CRC scrambled by the C-RNTI, for the PDCCH order to include the physical uplink control channel (PUCCH) resource indicator of a predetermined number of bits used to select a PUCCH resource from a resource list within a PUCCH resource set configured by a radio resource control (RRC) layer. The PUCCH resource indicator may identify the time-frequency resources to use in the PUCCH. For example and without limitation, the predetermined number of bits may be 3 bits.

In some examples, the scheduling entity may modify the DCI, with the CRC scrambled by the HD-FDD UE specific identifier, for the PDCCH order to include a transmitter power control (TPC) command for scheduled PUCCH used by the scheduling entity to provide PUCCH transmit power adjustment to the HD-FDD UE. In another example, the scheduling entity may modify the DCI format 1_0, with the CRC scrambled by the C-RNTI, for the PDCCH order to include a transmitter power control (TPC) command for scheduled PUCCH of a predetermined number of bits used by the scheduling entity to provide PUCCH transmit power adjustment to the HD-FDD UE. For example and without limitation, the predetermined number of bits may be 2 bits.

In some examples, the scheduling entity may modify the DCI, with the CRC scrambled by the HD-FDD UE specific identifier, for the PDCCH order to include a physical downlink shared channel-to-hybrid automatic repeat request (PDSCH-to-HARQ) feedback timing indicator indicating a slot offset for PUCCH transmission with respect to a last PDSCH transmission scheduled on the Pcell. In another example, the scheduling entity may modify the DCI format 1_0 with the CRC scrambled by the C-RNTI for the PDCCH order to include a physical downlink shared channel-to-hybrid automatic repeat request (PDSCH-to-HARQ) feedback timing indicator. The PDSCH-to-HARQ feedback timer may be given by an integer, K3, where K3≥3. The range of K3 is exemplary and non-limiting. The PDSCH-to-HARQ feedback timing indicator may indicate a slot offset for PUCCH transmission with respect to a last PDSCH transmission scheduled on the Pcell.

In other examples, the scheduling entity may modify the DCI, with the CRC scrambled by the HD-FDD UE specific identifier, for the PDCCH order to include a resource configuration for uplink reference signal (RCURS) configured to be transmitted on the target uplink carrier by the HD-FDD UE, where the RCURS may indicate a resource configuration for a dedicated reference signal to be transmitted by the HD-FDD UE after the HD-FDD UE switches from the first uplink carrier of the Pcell to an active bandwidth part (BWP) of the target uplink carrier. In another example, the scheduling entity may modify the DCI format 1_0 with the CRC scrambled by the C-RNTI for the PDCCH order to include a resource configuration for uplink reference signal (RCURS) configured to be transmitted on the target uplink carrier by the HD-FDD UE. RCURS may be given by an integer, K4, where K4>1. The range of K4 is exemplary and non-limiting. This field may indicate a resource configuration for a dedicated reference signal to be transmitted by the HD-FDD UE after the HD-FDD UE switches from the first uplink carrier of the Pcell to the target uplink carrier. In general, after the HD-FDD UE is switched to the target UL carrier, the HD-FDD UE will transmit control or traffic. However, before the HD-FDD UE transmits control or traffic, it may transmit a reference signal, for example a sounding reference signal (SRS), on the target UL carrier. The RCURS may inform the UE which reference signal to transmit, which sequence, and which allocation to use for the reference signal.

The transmission of a dedicated reference signal on the target UL carrier may serve multiple purposes, including, for example, tracking UL timing offset on the switched UL carrier, acknowledging the successful decoding of the DCI for UL carrier switching, and channel sounding. The reference signal is a dedicated reference signal because it is used for only a given HD-FDD UE. The identity of the HD-FDD UE is established because the HD-FDD UE and the scheduling entity are in an RRC connected state.

The K4 resource allocation for the dedicated reference signal may include at least resource allocation for the dedicated UL reference signal resources and TPC command for the dedicated UL reference signal. There may be at least two alternatives for the resource allocation information for the dedicated UL reference signal. A first alternative may be a physical random access channel (PRACH) preamble sequence identifier (PRACH ID) and random access channel (RACH) occasion. A second alternative may be a sounding reference signal (SRS) sequence ID and resource mapping. Although the preceding two items of information are described as alternatives, it is within the scope of the disclosure to use both.

The scheduling entity may use the PUCCH resource indicator to tell the HD-FDD UE how to acknowledge the PDSCH. The HD-FDD UE may, for example, use the PUCCH to inform the scheduling entity whether it was successful (ACK) or not successful (NACK) in the reception of the PDSCH.

In one configuration, the scheduling entity 700 may include means for receiving, from a half-duplex frequency division duplex (HD-FDD) user equipment (UE), an initial attach request on a first uplink carrier of a primary cell (Pcell), means for entering into a radio resource control (RRC) connected state with the HD-FDD UE, means for determining an amount of data waiting to be uploaded to the scheduling entity from a buffer of the HD-FDD UE, a target uplink carrier that is different from the first uplink carrier of the Pcell, and an amount of time to grant to the HD-FDD UE, to upload the data from the buffer, and means for transmitting downlink control information (DCI) allocating to the HD-FDD the target uplink carrier for the amount of time to the HD-FDD UE. In one example, the scheduling entity may additionally have means for assigning a C-RNTI to the HD-FDD UE. In one aspect, the aforementioned means may be the processor 704 shown in FIG. 7 and configured to perform the functions recited by the aforementioned means. In another aspect, the aforementioned means may be a circuit, or any apparatus configured to perform the functions recited by the aforementioned means.

FIG. 9 is a block diagram illustrating an example of a hardware implementation of a scheduled entity (e.g., an FD-HDD UE, an NR-Light wireless communication device) (referred to herein as the HD-FDD UE 900) employing a processing system 914 according to some aspects of the disclosure. In accordance with various aspects of the disclosure, an element, or any portion of an element, or any combination of elements may be implemented with a processing system 914 that includes one or more processors, such as processor 904. For example, the HD-FDD UE 900 (the scheduled entity) may be a user equipment (UE), or wireless communication device as illustrated in any one or more of FIGS. 1 and/or 2.

The processing system 914 may be substantially the same as the processing system 714 illustrated in FIG. 7, including a bus interface 908, a bus 902, memory 905, a processor 904, and a computer-readable medium 906. Furthermore, the HD-FDD UE 900 may include a user interface 912, a transceiver 910, an antenna/antenna array/antenna module 920, and a power source 928 substantially similar to those described above in FIG. 7. That is, the processor 904, as utilized in HD-FDD UE 900 (the scheduled entity), may be used to implement any one or more of the processes described herein and illustrated, for example, in FIG. 6 and/or FIG. 10. According to the exemplary illustration of FIG. 9, the transceiver 910 of the HD-FDD UE 900 includes a plurality of SPDT switches (e.g., SPDT 1 911 through SPDTn 913). Each SPDT switch is coupled to a receiver (e.g., R1) at a first throw of the transceiver 910, a transmitter (e.g., T1) at a second throw of the transceiver 910, and to one of the plurality of antennas 920 at the pole of the SPDT switch. The SPDT switches may replace multiplexors as described earlier. The operation of the SPDT switches will be understood by those of skill in the art and will not be provided herein for the sake of brevity. The bus interface 908 may couple to each SPDT switch, either directly or indirectly through the transceiver 910. The bus interface 908 may also couple to the plurality of antennas, according to some aspects, and may facilitate self-test of the transceiver 910 by the HD-FDD UE 900.

In some aspects of the disclosure, the processor 904 may include communication and processing circuitry 941 configured for various functions, including for example communicating with a scheduled entity, for example via a first uplink carrier of a primary cell (Pcell), a network core (e.g., a 5G core network), other scheduled entities, or any other entity, such as, for example, local infrastructure or an entity communicating with the HD-FDD UE 900 (the scheduled entity) via the Internet, such as a network provider. In some examples, the communication and processing circuitry 941 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 941 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 941 may further be configured to execute communication and processing software 951 stored on the computer-readable medium 906 to implement one or more functions described herein.

In some aspects of the disclosure, the processor 904 may include a downlink control information (DCI) circuitry 942 configured for various functions, including, for example, receiving, from a scheduling entity, a downlink control information (DCI) message that includes an allocation of a target uplink carrier, that is different from the first uplink carrier, and includes an amount of time allocated for an uplink transmission on the target uplink carrier. In some examples, the DCI circuitry 942 may include one or more hardware components that provide the physical structure that performs processes related to performing the reception of the DCI message including the target uplink carrier, that is different from the first uplink carrier of the primary cell (Pcell), and the amount of time allocated for the uplink transmission on the target uplink carrier. The DCI circuitry 942 may further be configured to execute DCI software 952 stored on the computer-readable medium 906 to implement one or more functions described herein.

In some aspects of the disclosure, the processor 904 may include carrier switching circuitry 943 configured for various functions, including, for example, switching from the first uplink carrier of the Pcell to the target uplink carrier. In some examples, the carrier switching circuitry 943 may include one or more hardware components that provide the physical structure that performs processes related to performing the switching (of frequencies) from the first uplink carrier of the Pcell to the target uplink carrier. The carrier switching circuitry 943 may further be configured to execute carrier switching software 953 stored on the computer-readable medium 906 to implement one or more functions described herein.

In some aspects of the disclosure, the processor 904 may include buffer transmission circuitry 944 configured for various functions, including, for example, transmitting, over the target uplink carrier, data stored in a buffer of the HD-FDD UE to the scheduling entity during the time allocated for the uplink transmission. In some examples, the buffer transmission circuitry 944 may include one or more hardware components that provide the physical structure that performs processes related to performing the transmission of data stored in a buffer of the HD-FDD UE to the scheduling entity during the time allocated for the uplink transmission. In some examples, one or more hardware components that provide the physical structure that performs processes related to buffering data of the HD-FDD UE may be exemplified by the memory 905 of the HD-FDD UE 900 (the scheduled entity) and more particularly by the buffer 930 of the memory 905 of the HD-FDD UE 900. The buffer transmission circuitry 944 may further be configured to execute buffer transmission software 954 stored on the computer-readable medium 906 to implement one or more functions described herein.

Figure 10:
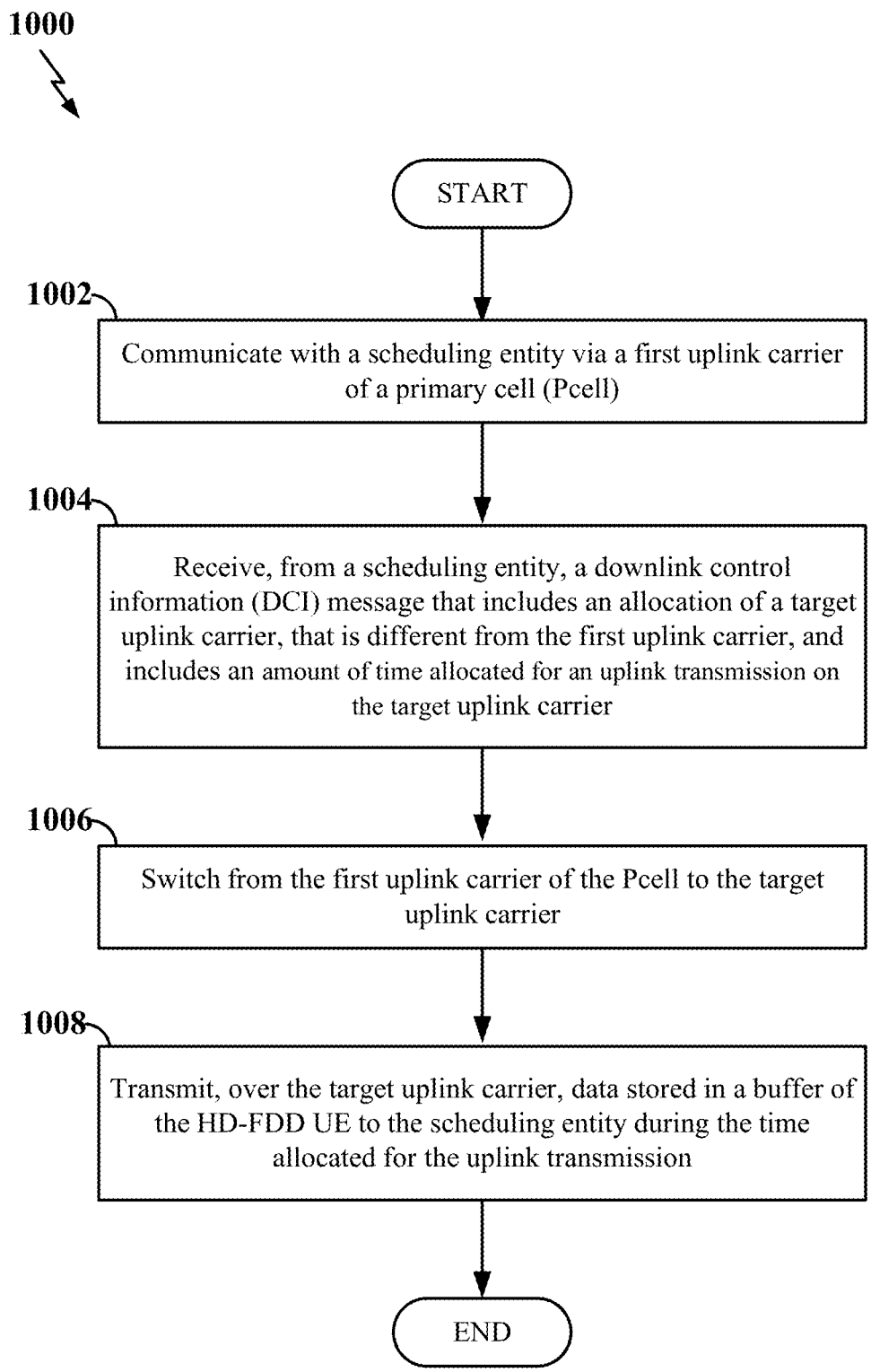
FIG. 10 is a flow chart illustrating an exemplary process (e.g., a method) for using a modified or repurposed downlink control information (DCI) to switch UL carrier frequencies of an HD-FDD UE according to some aspects of the disclosure.

FIG. 10 is a flow chart illustrating an exemplary process 1000 (e.g., a method) for using a modified or repurposed DCI to switch UL carrier frequencies of an HD-FDD UE, such as HD-FDD UE 900 of FIG. 9 according to some aspects of the disclosure. As described below, some or all illustrated features may be omitted in a particular implementation within the scope of the present disclosure, and some illustrated features may not be required for the implementation of all examples. In some examples, the process 1000 may be carried out by the HD-FDD UE 900 (the scheduled entity) illustrated in FIG. 9. In some examples, the process 1000 may be carried out by any suitable apparatus or means for carrying out the functions or algorithms described herein.

At block 1002, the HD-FDD may communicate with a scheduling entity via a first uplink carrier of a primary cell (Pcell). For example, the communication and processing circuitry 941, and/or the transceiver 910, shown and described above in connection with FIG. 9, may provide the means for communicating with a scheduling entity via the first uplink carrier of a primary cell (Pcell). At block 1004 the HD-FDD UE may receive, from a scheduling entity, a downlink control information (DCI) message that includes an allocation of a target uplink carrier, that is different from a first uplink carrier and includes an amount of time allocated for an uplink transmission on the target uplink carrier. For example, the downlink control information circuitry 942, and/or the transceiver 910, shown and described above in connection with FIG. 9, may provide the means for receiving, from a scheduling entity, the downlink control information (DCI) message that includes the allocation of a target uplink carrier, that is different from the first uplink carrier, and includes the amount of time allocated for the uplink transmission on the target uplink carrier. At block 1006, the HD-FDD UE may switch (frequencies) from the first uplink carrier of the Pcell to the target uplink carrier. For example, the carrier (frequency) switching circuitry 943, and/or the transceiver 910, shown and described above in connection with FIG. 9, may provide the means for switching (frequencies) from the first uplink carrier of the Pcell to the target uplink carrier. At block 1008, the HD-FDD UE may transmit, over the target uplink carrier, data stored in a buffer of the HD-FDD UE to the scheduling entity during the time allocated for the uplink transmission. For example, the buffer transmission circuitry 944, the memory 905, the buffer 930, and/or the transceiver 910, shown and described above in connection with FIG. 9, may provide the means for transmitting, over the target uplink carrier, data stored in the buffer of the HD-FDD UE 900 to the scheduling entity during the time allocated for the uplink transmission.

According to some aspects, an HD-FDD UE (e.g., HDD-FDD UE 900 of FIG. 9) may perform an initial attach procedure over the first uplink carrier of the Pcell with the scheduling entity prior to receiving the DCI. In some examples the HD-FDD UE, prior to receiving the DCI, may receive an HD-FDD UE specific identifier from the scheduling entity, and may enter a radio resource control (RRC) connected state with the scheduling entity. In another example, the HD-FDD UE 900, prior to receiving the DCI, may receive a C-RNTI from the scheduling entity, and may enter into a radio resource control (RRC) connected state with the scheduling entity.

In some examples, the HD-FDD UE 900 may monitor a first downlink carrier frequency of a downlink primary cell (DL Pcell) for a physical downlink control channel (PDSCH) including the DCI.

In some examples, the DCI may be a modified DCI PDCCH order with a cyclic redundancy check (CRC) scrambled by an HD-FDD UE specific identifier. In this example, the HD-FDD UE may obtain the target uplink carrier from an uplink carrier indicator field (UCIF) of the modified DCI PDCCH order with the CRC scrambled by the HD-FDD UE specific identifier. The HD-FDD UE may also obtain the amount of time allocated for the uplink transmission on the target uplink carrier from a timer of uplink switching (TULS) field of the modified DCI PDCCH order with the CRC scrambled by the HD-FDD UE specific identifier. In another example the DCI may be a modified DCI format 1_0 with cyclic redundancy check (CRC) scrambled by a C-RNTI of the HD-FDD UE PDCCH order. The HD-FDD UE may also obtain the target uplink carrier from an uplink carrier indicator field (UCIF) of the modified DCI format 1_0 with the CRC scrambled by the C-RNTI of the HD-FDD UE PDCCH order. The HD-FDD UE may also obtain an amount of time allocated for UL transmission on the target UL carrier from a timer of uplink switching (TULS) field of the modified DCI format 1_0 with the CRC scrambled by the C-RNTI of the HD-FDD UE PDCCH order.

According to some aspects, the HD-FDD UE may be configured to switch back to the first uplink carrier of Pcell at an end of the amount of time allocated for UL transmission on the target UL carrier. After the expiration of the TULS timer, the HD-FDD automatically switches its UL carrier back to the first UL carrier of the Pcell. If the HD-FDD has not finished transferring all of the data in its buffer before expiration of the TULS timer, the HD-FDD UE may transmit the remainder of the buffer over the first UL carrier of the Pcell.

In one configuration, the HD-FDD UE 900 for wireless communication includes means for receiving, from a scheduling entity, a downlink control information (DCI) message including a target uplink carrier, that is different from a first uplink carrier of a primary cell (Pcell), and an amount of time allocated for an uplink transmission on the target uplink carrier, means for switching (frequencies) from the first uplink carrier of the Pcell to the target uplink carrier, and means for transmitting data stored in a buffer of the HD-FDD UE to the scheduling entity during the time allocated for UL transmission.

In one aspect, the aforementioned means may be the processor 904 shown in FIG. 9 and configured to perform the functions recited by the aforementioned means. In another aspect, the aforementioned means may be a circuit, or any apparatus configured to perform the functions recited by the aforementioned means.

FIG. 11 is an example of a modified or repurposed DCI, with a cyclic redundancy check (CRC) scrambled by an HD-FDD UE specific identifier, for the PDCCH order table (referred to as Table 1100) according to some aspects of the disclosure. An example of a modified or repurposed DCI may be a DCI or DCI format 1_0 with a CRC scrambled by a C-RNTI. Table 1100 has three columns, a first column holds a field name 1102, a second column holds a number of bits in the field 1104, and a third column holds a description of the field 1106. Table 1100 has 9 rows. The number of rows is exemplary and non-limiting. The first row may correspond to an identifier for DCI formats field 1108, which may have 1 bit and may differentiate DCI format 0_0 and DCI format 1_0. For example, for DCI format 1_0, this field may be set to 1. The second row may correspond to a frequency domain resource assignment (FDRA) field 1110, where the number of bits for this field may be determined by the number of resource blocks (RBs) in a downlink (DL) bandwidth part (BWP). The third row may correspond to an uplink carrier indicator (UCIF) field 1112, which may have K1 bits, where K1≥1. This field may indicate the UL target carrier. The fourth row may correspond to the timer of uplink switching (TULS) field 1114, which may have K2 bits, where K2≥1. This field may indicate a duration of the target uplink carrier transmission. In the example, the duration may be expressed as a number of slots or frames. The fifth row may correspond to a PUCCH resource indicator field 1116, which may have 3 bits. This field may identify time-frequency resources for the PUCCH. The sixth row may correspond to a TPC command for PUCCH field 1118, which may have 2 bits. This field may identify the transmit power control for the PUCCH. The seventh row may correspond to a PDSCH-to-HARQ feedback timing indicator field 1120, which may have K3 bits, where K3≥3. This field may indicate a slot offset for PUCCH transmission with respect to a last PDSCH transmission. The eighth row may correspond to a resource configuration for UL reference signal (RCURS) transmitted on the switched UL carrier field 1122, which may have K4 bits, where K4≥1. This field may indicate a resource configuration for an UL reference signal (RCURS) transmitted on the switched UL carrier. The ninth row may be reserved for additional or alternative fields 1124. The modified or repurposed fields in the exemplary Table 1100 include, for example, the fields identified in this disclosure in the third row (UCIF field 1112) and the fourth row (TULS field 1114). The fields in the fifth row (PUCCH resource indicator field 1116), sixth row (TPC command for PUCCH field 1118), seventh row (PDSCH-to-HARQ feedback timing indicator field 1120), and eighth row (resource configuration for UL reference signal (RCURS) transmitted on the switched UL carrier field 1122) may be used in other DCI formats but have heretofore not been used in a DCI format 1_0 format.

Of course, in the above examples, the circuitry included in the processor 704 and/or 904 is merely provided as an example, and other means for carrying out the described functions may be included within various aspects of the present disclosure, including but not limited to the instructions stored in the computer-readable medium 706 and/or 906, or any other suitable apparatus or means described in any one of the FIGS. 1, 2, 4, 6, 7, and/or 9, and utilizing, for example, the processes and/or algorithms described herein in relation to FIGS. 6, 8, 10, and/or 11.

The following provides an overview of aspects of the present disclosure:

Aspect 1. A method of wireless communication, the method comprising, at a scheduling entity: receiving, from a half-duplex frequency division duplex (HD-FDD) user equipment (UE), an initial attach request on a first uplink carrier of a primary cell (Pcell), entering into a radio resource control (RRC) connected state with the HD-FDD UE, determining an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer, transmitting downlink control information (DCI) allocating to the HD-FDD UE the target uplink carrier for the amount of time to the HD-FDD UE.

Aspect 2. The method of aspect 1, further comprising: configuring (or attaching) the DCI as a DCI, with a cyclic redundancy check (CRC) scrambled by an HD-FDD specific identifier, for a physical downlink control channel (PDCCH) order.

Aspect 3. The method of aspect 1 or 2, further comprising: modifying the DCI, with the CRC scrambled by the HD-FDD specific identifier, for the PDCCH order to include an uplink carrier indicator field (UCIF) to indicate the target uplink carrier to the HD-FDD UE, modifying the DCI, with the CRC scrambled by the HD-FDD UE specific identifier, for the PDCCH order to include a timer of uplink switching (TULS) field to indicate the amount of time to the HD-FDD UE.

Aspect 4. The method of any of aspects 1 through 3, where: the UCIF comprises one or more bits, and the TULS field comprises one or more bits that indicate the amount of time as at least one of: a number of slots, or frames, of uplink transmissions.

Aspect 5. The method of any of aspects 1 through 4, further comprising: modifying the DCI, with the CRC scrambled by the HD-FDD UE specific identifier, for the PDCCH order to include a physical uplink control channel (PUCCH) resource indicator of 3 bits used to select a PUCCH resource from a resource list within a PUCCH resource set configured by a radio resource control (RRC) layer.

Aspect 6. The method of any of aspects 1 through 5, further comprising: modifying the DCI, with the CRC scrambled by the HD-FDD UE specific identifier, for the PDCCH order to include a transmitter power control (TPC) command for scheduled PUCCH of 2 bits used by the scheduling entity to provide PUCCH transmit power adjustment to the HD-FDD UE.

Aspect 7. The method of any of aspects 1 through 6, further comprising: modifying the DCI, with the CRC scrambled by the HD-FDD UE specific identifier, for the PDCCH order to include a physical downlink shared channel-to-hybrid automatic repeat request (PDSCH-to-HARQ) feedback timing indicator of 3 or more bits indicating a slot offset for PUCCH transmission with respect to a last PDSCH transmission scheduled on the Pcell.

Aspect 8. The method of any of aspects 1 through 7, further comprising: modifying the DCI, with the CRC scrambled by the HD-FDD UE specific identifier, for the PDCCH order to include a resource configuration for uplink reference signal (RCURS) configured to be transmitted on the target uplink carrier by the HD-FDD UE, where the RCURS includes more than one bit indicating a resource configuration for a dedicated reference signal to be transmitted by the HD-FDD UE after the HD-FDD UE switches from the first uplink carrier of the Pcell to the target uplink carrier.

Aspect 9. The method of any of aspects 1 through 8, further comprising: including at least one of: a physical random access channel (PRACH) preamble sequence identifier (PRACH ID) and random access channel (RACH) occasion, or a sounding reference signal (SRS) sequence ID and resource mapping in the RCURS.

Aspect 10. A scheduling entity in a wireless communication network, comprising a wireless transceiver, a memory, a processor communicatively coupled to the wireless transceiver and the memory, where the processor and the memory are configured to: receive, from a half-duplex frequency division duplex (HD-FDD) user equipment (UE), an initial attach request on a first uplink carrier of a primary cell (Pcell), enter into a radio resource control (RRC) connected state with the HD-FDD UE, determine an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer, transmit downlink control information (DCI) allocating to the HD-FDD UE the target uplink carrier for the amount of time to the HD-FDD UE.

Aspect 11. The scheduling entity of aspect 10, where the processor and the memory are further configured to: configure or attach the DCI, with a CRC scrambled by the HD-FDD UE specific identifier, as a DCI format 1_0 with cyclic redundancy check (CRC) scrambled by the Cell-Radio Network Temporary Identifier (C-RNTI) for a physical downlink control channel (PDCCH) order.

Aspect 12. The scheduling entity of aspect 10 or 11, where the processor and the memory are further configured to: modify the DCI, with the CRC scrambled by the HD-FDD UE specific identifier, for the PDCCH order to include an uplink carrier indicator field (UCIF) to indicate the target uplink carrier to the HD-FDD UE, modify the DCI, with the CRC scrambled by the HD-FDD UE specific identifier, for the PDCCH order to include a timer of uplink switching (TULS) field to indicate the amount of time to the HD-FDD UE.

Aspect 13. The scheduling entity of any of aspects 10 through 12, where: the UCIF comprises one or more bits, and the TULS field comprises one or more bits that indicate the amount of time as at least one of: a number of slots or frames of uplink transmission.

Aspect 14. The scheduling entity of any of aspects 10 through 13: where the processor and the memory are further configured to: modify the DCI, with the CRC scrambled by the HD-FDD UE specific identifier, for the PDCCH order to include a physical uplink control channel (PUCCH) resource indicator used to select a PUCCH resource from a resource list within a PUCCH resource set configured by a radio resource control (RRC) layer.

Aspect 15. The scheduling entity of any of aspects 10 through 14: where the processor and the memory are further configured to: modify the DCI, with the CRC scrambled by the HD-FDD UE specific identifier, for the PDCCH order to include a transmitter power control (TPC) command for scheduled PUCCH used by the scheduling entity to provide PUCCH transmit power adjustment to the HD-FDD UE.

Aspect 16. The scheduling entity of any of aspects 10 through 15: where the processor and the memory are further configured to: modify the DCI, with the CRC scrambled by the HD-FDD UE specific identifier, for the PDCCH order to include a physical downlink shared channel-to-hybrid automatic repeat request (PDSCH-to-HARQ) feedback timing indicator indicating a slot offset for PUCCH transmission with respect to a last PDSCH transmission scheduled on the Pcell.

Aspect 17. The scheduling entity of any of aspects 10 through 16: where the processor and the memory are further configured to: modify the DCI, with the CRC scrambled by the HD-FDD UE specific identifier, for the PDCCH order to include a resource configuration for uplink reference signal (RCURS) configured to be transmitted on the target uplink carrier by the HD-FDD UE, where the RCURS may indicate a resource configuration for a dedicated reference signal to be transmitted by the HD-FDD UE after the HD-FDD UE switches from the first uplink carrier of the Pcell to the target uplink carrier.

Aspect 18. The scheduling entity of any of aspects 10 through 17: where the processor and the memory are further configured to: include at least one of: a physical random access channel (PRACH) preamble sequence identifier (PRACH ID) and random access channel (RACH) occasion, or a sounding reference signal (SRS) sequence ID and resource mapping in the RCURS.

Aspect 19. A method of wireless communication, the method comprising, at a half-duplex frequency division duplex user equipment (HD-FDD UE): communicating with a scheduling entity via a first uplink carrier of a primary cell (PCell), receiving, from a scheduling entity, a downlink control information (DCI) message that includes an allocation of a target uplink carrier, that is different from the first uplink carrier, and includes an amount of time allocated for an uplink transmission on the target uplink carrier, switching from the first uplink carrier of the Pcell to the target uplink carrier, transmitting, over the target uplink carrier, data stored in a buffer of the HD-FDD UE to the scheduling entity during the time allocated for the uplink transmission.

Aspect 20. The method of aspect 19, further comprising: performing an initial attach procedure over the first uplink carrier of the Pcell with the scheduling entity prior to receiving the DCI.

Aspect 21. The method of aspect 19 or 20, further comprising: prior to receiving the DCI receiving an HD-FDD UE specific identifier from the scheduling entity, entering a radio resource control (RRC) connected state with the scheduling entity.

Aspect 22. The method of any of aspects 19 through 21, further comprising: monitoring a first downlink carrier frequency of a downlink primary cell (DL Pcell) for a physical downlink control channel (PDSCH) including the DCI.

Aspect 23. The method of any of aspects 19 through 22: where the DCI is a modified DCI, with a CRC scrambled by an HD-FDD UE specific identifier, for the PDCCH order, further comprising: obtaining the target uplink carrier from an uplink carrier indicator field (UCIF) of the modified DCI, with the CRC scrambled by the HD-FDD UE specific identifier, PDCCH order, obtaining the amount of time allocated for the uplink transmission on the target uplink carrier from a timer of uplink switching (TULS) field of the modified DCI, with the CRC scrambled by the HD-FDD UE specific identifier, for the PDCCH order.

Aspect 24. The method of any of aspects 19 through 23, further comprising: switching back to the first uplink carrier of Pcell at an end of the amount of time allocated for the uplink transmission on the target uplink carrier.

Aspect 25. A half-duplex frequency division duplex (HD-FDD) user equipment (UE) in a wireless communication network, comprising: a wireless transceiver, a memory, a processor communicatively coupled to the wireless transceiver and the memory, where the processor and the memory are configured to communicate with a scheduling entity via a first uplink carrier of a primary cell (Pcell), receive, from a scheduling entity, a downlink control information (DCI) message that includes an allocation of a target uplink carrier, that is different from the first uplink carrier, and includes an amount of time allocated for an uplink transmission on the target uplink carrier, switch from the first uplink carrier of the Pcell to the target uplink carrier, transmit, over the target uplink carrier, data stored in a buffer of the HD-FDD UE to the scheduling entity during the time allocated for the uplink transmission.

Aspect 26. The HD-FDD UE of aspect 25: where the processor and the memory are further configured to: perform an initial attach procedure over the first uplink carrier of the Pcell with the scheduling entity prior to receiving the DCI.

Aspect 27. The HD-FDD UE of aspect 25 or 26: where, prior to receiving the DCI, the processor and the memory are further configured to: receive an HD-FDD specific identifier from the scheduling entity, and enter a radio resource control (RRC) connected state with the scheduling entity.

Aspect 28. The HD-FDD UE of any of aspects 25 through 27: where the processor and the memory are further configured to: monitor a first downlink carrier frequency of a downlink primary cell (DL Pcell) for a physical downlink control channel (PDSCH) including the DCI.

Aspect 29. The HD-FDD UE of any of aspects 25 through 28: where the DCI is a modified DCI, with a cyclic redundancy check (CRC) scrambled by the HD-FDD specific identifier, for the PDCCH order and the processor and the memory are further configured to: obtain the target uplink carrier from an uplink carrier indicator field (UCIF) of the modified DCI, with the CRC scrambled by the HD-FDD UE specific identifier, for the PDCCH order, obtain the amount of time allocated for the uplink transmission on the target uplink carrier from a timer of uplink switching (TULS) field of the modified DCI, with the CRC scrambled by the HD-FDD UE specific identifier, for the PDCCH order.

Aspect 30. The HD-FDD UE of any of aspects 25 through 29, where: the processor and the memory are further configured to: switch back to the first uplink carrier of the Pcell at an end of the amount of time allocated for the uplink transmission on the target uplink carrier.

Aspect 31: A scheduling entity configured for wireless communication comprising at least one means for performing any one of aspects 1 through 9.

Aspect 32: A non-transitory computer-readable medium storing computer-executable code, comprising code for causing a scheduling entity to perform a method of any one of aspects 1 through 9.

Aspect 33: A half-duplex frequency division duplex user equipment (HD-FDD UE) configured for wireless communication comprising at least one means for performing any one of aspects 19 through 24.

Aspect 34: A non-transitory computer-readable medium storing computer-executable code, comprising code for causing a half-duplex frequency division duplex user equipment (HD-FDD UE) to perform a method of any one of aspects 19 through 24.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 4, 6, 7, and/or 9 may be configured to perform one or more of the methods, features, or steps described in FIGS. 8 and/or 10. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The term of the form A and/or B is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, the method comprising, at a scheduling entity:
    receiving, from a half-duplex frequency division duplex (HD-FDD) user equipment (UE), an initial attach request on a first uplink carrier of a primary cell (Pcell);
    entering into a radio resource control (RRC) connected state with the HD-FDD UE;
    determining an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer; and
    transmitting downlink control information (DCI) allocating to the HD-FDD UE the target uplink carrier for the amount of time to the HD-FDD UE.

2. The method of claim 1, further comprising:
    attaching the DCI, with a cyclic redundancy check (CRC) scrambled by an HD-FDD UE specific identifier, for a physical downlink control channel (PDCCH) order.

3. The method of claim 2, further comprising:
    modifying the DCI, with the CRC scrambled by the HD-FDD UE specific identifier, for the PDCCH order to include an uplink carrier indicator field (UCIF) to indicate the target uplink carrier to the HD-FDD UE; and
    modifying the DCI, with the CRC scrambled by the HD-FDD UE specific identifier, for the PDCCH order to include a timer of uplink switching (TULS) field to indicate the amount of time to the HD-FDD UE.

4. The method of claim 2, further comprising:
    modifying the DCI, with the CRC scrambled by the HD-FDD UE specific identifier, for the PDCCH order to include a physical uplink control channel (PUCCH) resource indicator used to select a PUCCH resource from a resource list within a PUCCH resource set configured by a radio resource control (RRC) layer.

5. The method of claim 2, further comprising:
    modifying the DCI, with the CRC scrambled by the HD-FDD UE specific identifier, for the PDCCH order to include a transmitter power control (TPC) command for scheduled PUCCH used by the scheduling entity to provide PUCCH transmit power adjustment to the HD-FDD UE.

6. The method of claim 2, further comprising:
    modifying the DCI, with the CRC scrambled by the HD-FDD UE specific identifier, for the PDCCH order to include a physical downlink shared channel-to-hybrid automatic repeat request (PDSCH-to-HARQ) feedback timing indicator indicating a slot offset for PUCCH transmission with respect to a last PDSCH transmission scheduled on the Pcell.

7. The method of claim 2, further comprising:
    modifying the DCI, with the CRC scrambled by the HD-FDD UE specific identifier, for the PDCCH order to include a resource configuration for uplink reference signal (RCURS) configured to be transmitted on the target uplink carrier by the HD-FDD UE, wherein the RCURS indicates a resource configuration for a dedicated reference signal to be transmitted by the HD-FDD UE after the HD-FDD UE switches from the first uplink carrier of the Pcell to an active bandwidth part (BWP) of the target uplink carrier.

8. A scheduling entity in a wireless communication network, comprising:
    a wireless transceiver;
    a memory; and
    a processor communicatively coupled to the wireless transceiver and the memory, wherein the processor and the memory are configured to:
        receive, from a half-duplex frequency division duplex (HD-FDD) user equipment (UE), an initial attach request on a first uplink carrier of a primary cell (Pcell);
        enter into a radio resource control (RRC) connected state with the HD-FDD UE;
        determine an amount of data waiting to be uploaded to the scheduling entity from a buffer of the HD-FDD UE, a target uplink carrier that is different from the first uplink carrier of the Pcell, and an amount of time to grant to the HD-FDD UE to upload the data from the buffer; and
        transmit downlink control information (DCI) allocating to the HD-FDD UE the target uplink carrier for the amount of time to the HD-FDD UE.

9. The scheduling entity of claim 8, wherein the processor and the memory are further configured to:
    attach the DCI, with a cyclic redundancy check (CRC) scrambled by an HD-FDD UE specific identifier, for a physical downlink control channel (PDCCH) order.

10. The scheduling entity of claim 9, wherein the processor and the memory are further configured to:
    modify the DCI, with the CRC scrambled by the HD-FDD UE specific identifier, for the PDCCH order to include an uplink carrier indicator field (UCIF) to indicate the target uplink carrier to the HD-FDD UE; and
    modify the DCI, with the CRC scrambled by the HD-FDD UE specific identifier, for the PDCCH order to include a timer of uplink switching (TULS) field to indicate the amount of time to the HD-FDD UE.

11. The scheduling entity of claim 9, wherein the processor and the memory are further configured to:
    modify the DCI, with the CRC scrambled by the HD-FDD UE specific identifier, for the PDCCH order to include a physical uplink control channel (PUCCH) resource indicator used to select a PUCCH resource from a resource list within a PUCCH resource set configured by a radio resource control (RRC) layer.

12. The scheduling entity of claim 9, wherein the processor and the memory are further configured to:
    modify the DCI, with the CRC scrambled by the HD-FDD UE specific identifier, for the PDCCH order to include a transmitter power control (TPC) command for scheduled PUCCH used by the scheduling entity to provide PUCCH transmit power adjustment to the HD-FDD UE.

13. The scheduling entity of claim 9, wherein the processor and the memory are further configured to:
    modify the DCI, with the CRC scrambled by the HD-FDD UE specific identifier, for the PDCCH order to include a physical downlink shared channel-to-hybrid automatic repeat request (PDSCH-to-HARQ) feedback timing indicator indicating a slot offset for PUCCH transmission with respect to a last PDSCH transmission scheduled on the Pcell.

14. The scheduling entity of claim 9, wherein the processor and the memory are further configured to:
modify the DCI, with the CRC scrambled by the HD-FDD UE specific identifier, for the PDCCH order to include a resource configuration for uplink reference signal (RCURS) configured to be transmitted on the target uplink carrier by the HD-FDD UE, wherein the RCURS indicates a resource configuration for a dedicated reference signal to be transmitted by the HD-FDD UE after the HD-FDD UE switches from the first uplink carrier of the Pcell to an active bandwidth part (BWP) of the target uplink carrier.

15. A method of wireless communication, the method comprising, at a half-duplex frequency division duplex user equipment (HD-FDD UE):
communicating with a scheduling entity via a first uplink carrier of a primary cell (PCell);
receiving, from a scheduling entity, a downlink control information (DCI) message that includes an allocation of a target uplink carrier, that is different from the first uplink carrier, and includes an amount of time allocated for an uplink transmission on the target uplink carrier;
switching from the first uplink carrier of the Pcell to the target uplink carrier; and
transmitting, over the target uplink carrier, data stored in a buffer of the HD-FDD UE to the scheduling entity during the time allocated for the uplink transmission.

16. The method of claim 15, further comprising:
performing an initial attach procedure over the first uplink carrier of the Pcell with the scheduling entity prior to receiving the DCI.

17. The method of claim 15, further comprising, prior to receiving the DCI:
receiving an HD-FDD UE specific identifier from the scheduling entity; and
entering a radio resource control (RRC) connected state with the scheduling entity.

18. The method of claim 15, further comprising:
monitoring a first downlink carrier frequency of a downlink primary cell (DL Pcell) for a physical downlink control channel (PDSCH) including the DCI.

19. The method of claim 15, wherein the DCI is a modified DCI PDCCH order with a cyclic redundancy check (CRC) scrambled by the HD-FDD UE specific identifier, further comprising:
obtaining the target uplink carrier from an uplink carrier indicator field (UCIF) of the modified DCI PDCCH order with the CRC scrambled by the HD-FDD UE specific identifier; and
obtaining the amount of time allocated for the uplink transmission on the target uplink carrier from a timer of uplink switching (TULS) field of the modified DCI PDCCH order with the CRC scrambled by the HD-FDD UE specific identifier.

20. The method of claim 15, further comprising:
switching back to the first uplink carrier of Pcell at an end of the amount of time allocated for the uplink transmission on the target uplink carrier.

* * * * *